United States Patent [19]

Herregods et al.

[11] Patent Number: 5,654,808

[45] Date of Patent: Aug. 5, 1997

[54] SCREENING METHOD FOR A RENDERING DEVICE HAVING RESTRICTED DENSITY RESOLUTION

[75] Inventors: Marc Herregods, Hever; Dirk Broddin, Edegem; Paul Delabastita, Antwerpen, all of Belgium

[73] Assignee: AGFA-GEvaert, Mortsel, Belgium

[21] Appl. No.: 271,343

[22] Filed: Jul. 6, 1994

[30] Foreign Application Priority Data

Jul. 12, 1993 [BE] Belgium ............................. 09300713

[51] Int. Cl.⁶ ........................................... H04N 1/40

[52] U.S. Cl. .......................... 358/456; 358/455; 358/458; 382/272

[58] Field of Search ........................ 358/298, 455, 358/456, 458, 459, 465, 466; 395/109; 382/270, 272; 355/296

[56] References Cited

U.S. PATENT DOCUMENTS

| | | | |
|---|---|---|---|
| 4,578,714 | 3/1986 | Sugiura et al. | 358/457 |
| 5,155,599 | 10/1992 | Delabastita | 358/454 |

*Primary Examiner*—Kim Vu
*Assistant Examiner*—Kimberly A. Williams
*Attorney, Agent, or Firm*—Richard J. Birch

[57] ABSTRACT

A method is described for the rendering of an image on a carrier by a rendering system having a restricted density resolution. A classic screening method for a binary rendering technique is extrapolated to a plurality of energy levels that belong to three classes: non-marking, non-stable and marking stable energy levels. For each class, specific rules must be respected, in order to obtain predictable results without density discontinuities on the carrier. The methods make full use of the spatial and density resolution of the rendering system in areas of high density and increase the reproducibility of low densities by giving up some spatial resolution in the lower density regions.

24 Claims, 17 Drawing Sheets

SCREENING METHOD FOR A RENDERING DEVICE HAVING RESTRICTED DENSITY RESOLUTION

DESCRIPTION

1. Field of the Invention

The present invention relates to a method and an apparatus for the registration of images on a transparent or opaque carrier by a rendering system having a restricted set of energy levels. The method can be used in electrophotographic printers or copiers.

2. Background of the Invention

Rendering systems have always a restricted spatial resolution, which mainly depends on the addressability of the rendering system. They also have a restricted density resolution. In the next table, we give some specific values for the addressability and density resolution. The addressability is expressed as the number of available positions per linear unit, mostly dpi or "dots per inch".

| System | Addressability | Density resolution |
| --- | --- | --- |
| Paper laser printer | 200–600 dpi | Binary: 2 levels |
| Phototypesetter | 2400 dpi | Binary: 2 levels |
| Medical laser recorder | 300 dpi | 256–4096 levels |
| Thermal printer | 300 dpi | 8–32 levels |
| Improved electrophotographic printer | 300–600 dpi | 4–64 levels |

The European patent application EP 0 304 289 A2 describes a method applicable to a thermal printer with thirteen energy levels. The method assumes that the rendering system has minimally two threshold values and as such three energy levels and enhances the restricted density resolution by screening techniques based on a dither matrix. The energy levels for the microdots are changed according to specific rules when the input image level increases. The rules are fixed for consecutive intervals of the image signal.

The object of that method is to avoid large gradation differences. Six rules determine each a pattern or type according to which the energy levels are assigned in a screen cell. Some of these types are probably advantageous for a thermal printer, but are not suited for use in an electrophotographic process. The first pattern (type 1) tries to achieve a smooth distribution of the thermal or electrostatic energy around a point of high density. For electrophotographic processes however, it is important to accentuate the transitions from low density to high density microdots, in order to ensure a reproducible and thus predictable density. A halftone dot composed according to type 1 of this invention, will behave nonstable in an electrophotographic process having different energy levels. This is due to the outnumber of microdots having a low density. The density changes, obtained by halftone dots according to type 2, will be location dependent and thus be inconsistent caused by the non-stable behavior of the modified microdots. For higher densities, when the electrophotographic process behaves more stable and the contone capabilities can be fully exploited in order to achieve the maximum spatial resolution of the rendering device, type 6 negatively affects this advantage. In this type, just one specific microdot within the screen cell increases its density. Another microdot is addressed after the previous microdot reached its maximum density.

SUMMARY OF THE INVENTION

It is an object of the invention to obtain a screening method for the rendering of continuous tone image information on a carrier by means of an electrophotographic system capable of rendering more than two density levels per addressable microdot, wherein the energy levels are optimally chosen and used to obtain a continuous and predictable reproduction of the image.

In accordance with the present invention, a method is described for the rendering of an image on a carrier by a rendering system, comprising the following steps:

— the carrier is divided in microdots, each microdot being addressable by an address (x,y);

— the image is represented by one pixel per microdot, each pixel having as information the address (x,y) and an image signal $I_{x,y}$;

— a screen partitions all microdots in partitions of identical screen cells, each screen cell comprising M (M integer and M>1) microdots $R_i$;

— each microdot $R_i$ is associated with a pixel tone curve $L_i$, for transforming the image signal $I_{x,y}$ to an energy level $E_j$;

— for each pixel the microdot $R_i$ is determined from the address (x,y) and the image signal $I_{x,y}$ is transformed by the corresponding pixel tone curve $L_i$, to a suitable energy level $E_j$;

— the rendering system converts the energy level $E_j$ to a density level on the microdot having address (x,y).

The method is herein characterized that there are N (N integer and N>2) energy levels $E_j$—ordered in ascending or descending energy level order—and an index S ($1<S<N$) selected such that:

— $E_1$ is a non-marking and stable energy level

— $E_S \ldots E_N$ are marking and stable energy levels; and

— all other energy levels are marking and non-stable.

The images to which this invention relates, are perceived by the human eye as differences in density on a carrier and are contone images, as well black and white as color. The color images are composed for example of two or more color components. Continuous tone has the usual meaning of images that are perceived by the eye as a quasi continuous density representation. Also line art and binary images can be rendered by this method on a carrier.

A carrier can be usual white plain paper or colored paper. The carrier can also consist of a transparent sheet, as is used for overhead projections, a photographic film for use in photo-gravure or for medical diagnosis, a thermographic transparent or opaque sheet or any other object manufactured from any substance on which an optical density change of individual portions of the surface by any process can be realized.

The rendering system is preferably an electrophotographic device that fixes toner particles on a sheet of paper. Other rendering devices, on which the methods of the invention can be applied, are: a thermographic device that by a thermal process deposits material to a carrier or modifies locally the optical properties of the carrier; a rendering device, based on a laser, that is capable of addressing at a specific resolution microdots on a carrier and induces deposit of material or causes a photochemical transformation on the spot of a microdot, herein modifying the optical density of the microdot.

A microdot is the smallest addressable portion of the carrier, on which the rendering system can cause a density change. A microdot has a center. This center is the center of the spot on the carrier caused by the rendering system. Although this spot can have different shapes: square, rectangular, circular, elliptic, etc., we define here that the microdot has a rectangular shape. The center of the rectangle coincides with the center of the microdot. The horizontal side is as long as the distance between the centers of two horizontally adjacent microdots. The vertical side is as long as the distance between the centers of two vertically adjacent microdots. In the preferred embodiments, we restrict the discussion to square microdots, but the invention relates to microdots having an irregular shape. The addressing of the microdots is done by a unique address for the microdot, characterized for example by the horizontal position x and the vertical position y of the center of the microdot in a cartesian coordinate system, wherein the microdots are counted horizontally and vertically.

The density is a diffuse reflective or transmissive optical density of the rendered carrier, dependent on the transparent or opaque usage. The density referred to is the "microdensity", obtained by taking the ratio of the amount of incident light on one microdot and the amount of light reflected or transmitted by this microdot. The human eye perceives an integrated density. The area of integration is larger than a microdot. First of all, we assume that the electrophotographic process behaves linearly in the operational area and that the integrated density is obtained from the average of the micro densities of the microdots constituting the screen cell. This assumption rectifies the summation of pixel tone curves. Each pixel tone curve represents the energy level as a function of the image signal. The sum of these energy levels for the same image signal over all microdots of the screen cell is supposed to give the density level as a function of the image signal.

An energy level is defined as the amount of energy applied to the rendering system to cause a specific density change on one microdot on the carrier.

Image information in electronic form is traditionally represented by a matrix of pixels ("picture elements"). The row and column number for such a pixel in the matrix gives the address (r,k). The scale at which the image information represents the real world (in columns per m m and rows per m m of the real image), the addressability of the rendering system ("pitch" or the number of microdots per mm or per inch, expressed in dpi : dots per inch), the required scale and orientation of the image on the carrier, determine the relation between the address (r,k) of the image information and the address (x,y) on the carrier. For this invention, we presume that the image information is adapted to the resolution of the rendering system and correct orientation, by techniques known in the art, such that (r,k) and (x,y) coincide. These techniques are for example pixel replication (nearest neighbor), linear or bilinear interpolation, convolution by cubic B-spline functions or bell-shape functions in one or two dimensions etc. If the image information is offered at the resolution of the screen cells, then the most trivial technique will replicate all pixels up to the resolution of the rendering system.

An image signal is a signal that, together with similar signals, represents the image. These consecutive signals can be applied homogeneously in time and vary continuously over an electrical conductor, such as a coaxial cable in analog video applications. The moment at which the image signal is applied, is mostly representative for the position or the address of the microdot on the carrier to which the image signal corresponds. In most of the cases, the voltage amplitude of this image signal is proportional to the density required on the corresponding position on the carrier, in order to obtain a good visual perception of the image.

The image signal can be stored in digital form in a memory location and be retrieved by a central processing unit at the moment required to deliver it to the rendering system. Usually an image signal in digital format requires eight memory locations that each can represent zero or one. As such, each image signal can have 256 discrete levels. To each discrete level, a specific density can be assigned, such that the image on the carrier is optimally visually perceptible and aesthetic.

If the image is a color image, then for every location on the carrier a plurality of image signals is available. For applications in color electrophotography, typically three signals per pixel are available: for cyan, magenta and yellow colored toner particles. Usually a fourth image signal is present, for the black toner particles. The image signals for the location on the carrier but for a different color component, designate—independently from each other— energy levels for the rendering system, just as if the image signals for one color component has to form a black and white image on its own.

A screen is a two-dimensional periodical structure that is virtually applied to the carrier and groups microdots. Most screens are formed by adjacent identical parallelograms, called screen cells, with a horizontal basis and having their centers aligned on horizontal axes. The distance between two consecutive horizontal axes equals the height of the parallelogram. The centers of parallelograms, situated on top of each other, are situated on parallel slanted or vertical lines. A screen can be applied to the carrier under a specific raster angle. Depending on the raster angle and the size of the screen cell, each screen cell will contain an equal amount of microdots. Techniques to obtain. Such screens are described in the U.S. Pat. No. 5,155,599. In the preferred embodiments of the current invention, we primarily discuss rectangular or square screen cells, having a screen angle of zero degrees. The invention is however not restricted to such type of screen cells. Apart from parallelogram shaped screen cells, also screen cells having an L shape can be applied to the methods of this invention.

By the notion of identical screen cell is meant that all screen cells have the same shape, orientation and size. The position of the screen cell on the carrier is the only difference (translation in X and Y direction). De size and orientation of the screen cell are fixed such that each screen cell comprises the same amount of M (M bigger than 1) microdots $R_j$, each having the same relative position within the screen cell. This also means that with every position within the screen cell, always the same pixel tone curve is associated, whenever the screen cell is located on the carrier.

A pixel tone curve is a means for transforming in a one-to-one relation all possible values, conditions or levels of the image signal to one of the N available energy levels $E_j$. In a digital system in which the image signals are offered in words of eight bits, a pixel tone curve can be realized by a row of 256 energy level indexes, each having a value from 1 to N. The image signal can be applied as index in this row. The energy level index that appears from this row will further select the correct energy level to be applied to the rendering system.

A non-marking energy level is an energy level that does not contribute to the density of the microdot to which the energy level is applied nor to the microdots in its neighborhood, whatever the energy level, applied to the neighboring microdots, might be. Offering a non-marking energy level to all microdots of the carrier, results in no density change of the carrier. For an electrophotographic process this means that no toner at all is deposit on the carrier.

A marking energy level is an energy level that for all microdots getting this energy level—even those microdots surrounded by microdots subjected to a non-marking energy level—causes a density increment on the carrier. An electrophotographic process will fix toner particles on the carrier on each microdot driven by a marking energy level. In the detailed description of the invention, we describe a first experiment to determine whether an energy level is marking or not.

A stable energy level is an energy level $E_j$ that produces the corresponding micro density $D_j$ in a stable or reproducible way, within near tolerances. The reason that a density can be not reproducible is caused by the density of the surrounding microdots. Depending on the surrounding density, the same energy level $E_j$ can cause different micro density values for the microdot to which the energy level $E_j$ is applied. The density values have a statistical distribution with a average value $D_j$ and a variance $S_j$. An energy level is stable if the variance $S_j$ on the average density $D_j$ is not higher than a specific value, or the variation on the obtained micro density for the microdot is acceptable or reproducible within small tolerances. A stable energy level $E_j$ delivers a density $D_j$ that is almost independent from the neighborhood of the microdot.

A non-stable energy level is an energy level that is not a stable energy level. This means that the variance $S_j$ on the average produced density $D_j$ is larger than a specific value.

In the detailed description of the invention, we describe a second experiment for the determination of stable and non-stable energy levels.

According to these definitions and descriptions, it is clear that a non-marking energy level is stable, and a non-stable energy level is always marking, but the marking density depends on the microdots in the neighborhood.

BRIEF DESCRIPTION OF THE DRAWINGS

The invention is described hereinafter by way of examples, with reference to the accompanying figures wherein.

DETAILED DESCRIPTION OF THE INVENTION

Figure 1:
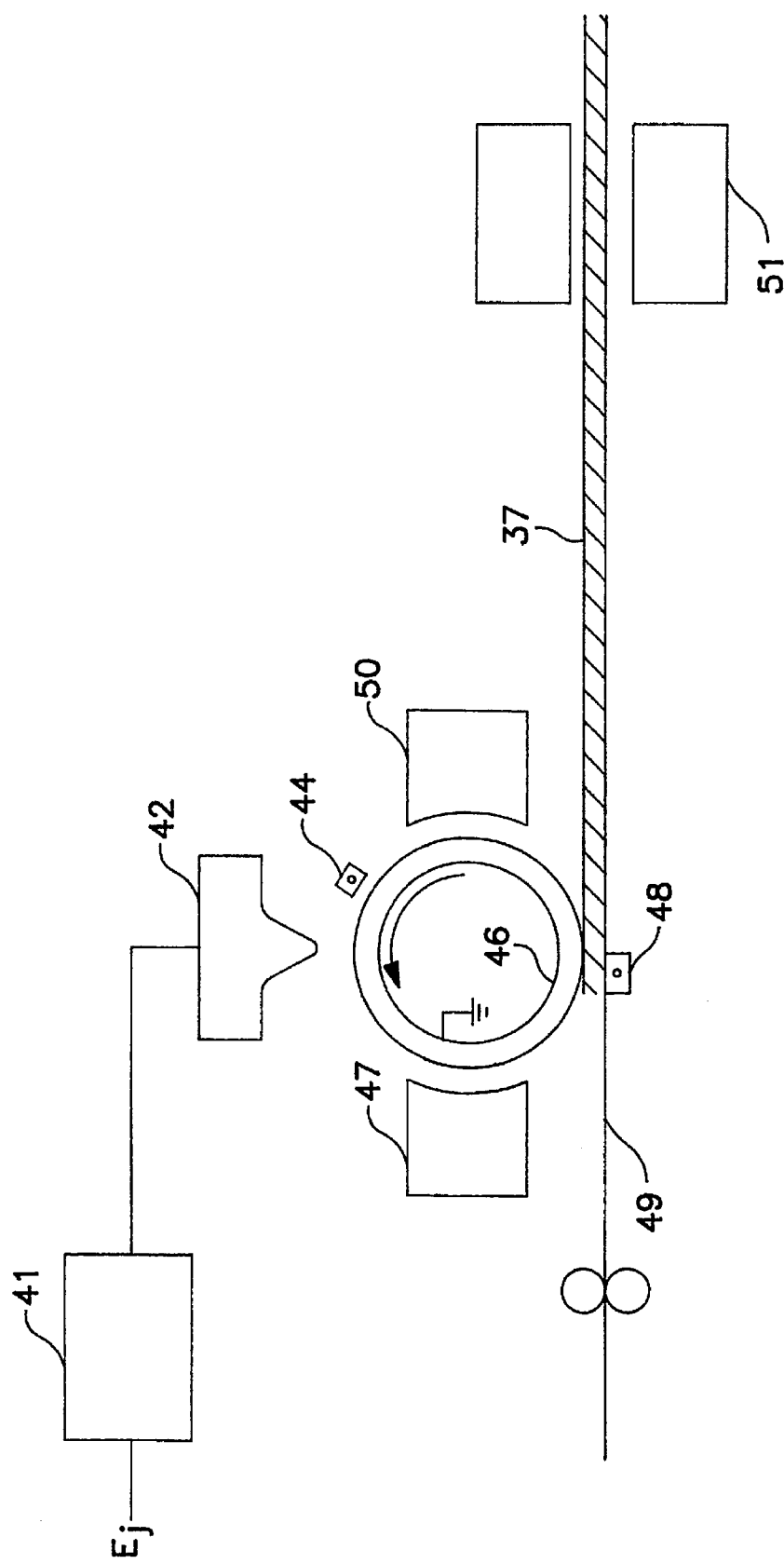
FIG. 1 is a schematic representation of an electrophotographic printer.

The electrophotographic printer for which the preferred embodiments are described, is an optical printer that can be conceived as a laser beam printer, LED printer, liquid crystal shutter displays, digital micro mirror devices, edge emitter LED's etc. A printer on which the methods of the current invention can be applied is the Chromapress system. This system is marketed by Agfa-Gevaert N.V. from Mortsel Belgium under the trade name Chromapress. It is a duplex color printer (cyan, magenta, yellow, black) having a resolution of 600 microdots per inch producing 1000 A3 pages per hour. Per microdot, 64 different energy levels for the impinged light energy can be selected. The drive signals are stored in the six most significant bits of a byte of eight bits. The drive signals for this system can thus range from 0 to 255. FIG. 1 represents a laser beam printer, on which the invention was applied. This rendering system is driven by an energy level $E_j$ from the raster image processor. The energy level is applied to a laser diode drive system 41. This system 41 determines a voltage, current, pulse duration and frequency to light up the laser diode 42. The amplitude of these signals are derived from the energy level $E_j$, which is translated in driving signals. A laser diode and the optical system 42 of the laser printer are driven by the drive signal of the laser diode drive system 41 to emit a laser beam. This laser beam scans the photosensitive drum 43 to form an electrostatic latent image that can be printed as an image on the carrier.

The outer surface of the photosensitive drum 43 is first negatively charged by a corona 44. This charge remains on the drum because it is built from photoconductive material and in the darkness, without impinging light, the drum is almost not conductive. On the places where the light impinges from the electro-optical rendering system 42 (e.g. an LED driven by pulse width modulation to induce a specific amount of light energy to the drum) a latent image is formed Because the photoconductive material becomes conductive and hence the locally present electrostatic charge is carried off to the conductive inner surface 46 of the drum, having a grounding. By local modulation of the total amount of light or modulation per microdot, the amount of electrostatic charge, that is locally carried off to the grounding, is controlled. The more electrostatic charge is carried off, the more toner particles will be locally offset and the higher the local density of the microdot will be . In the developer unit 47, the toner is offered to the photosensitive drum 43. The developer unit 47 contains a mix of toner particles and magnetic carrier particles. By a triboelectrical effect, the fine negatively charged toner particles stick to the coarse positively charged carrier particles. The carrier particles are attracted by a rotating magnetic cylinder (not shown in FIG. 1). This magnetic cylinder is kept at a negative voltage, intermediate between the potential of the charged and discharged microdot on the photosensitive drum 43. This way a rotating "magnetic brush" is realized. The brush hairs (magnetic carrier particles) attract the negatively toner particles, mainly by electromagnetic forces and offer the toner particles to the photosensitive drum 43, which is negatively charged on non-illuminated spots. On these spots, the drum will not receive any toner particles, because negatively charged objects repel each other. These spots will not "develop". On locations where the drum has been discharged by impinging light, toner particles will be attracted, for in that case the magnetic brush is at a lower potential khan the microdot on the photosensitive drum 43, the magnetic brush repels the negatively charged toner particles and the photosensitive drum 43 attracts the toner particles. The more the drum is locally discharged, the more toner particles—offered by the magnetic brush—will be accepted by the photosensitive drum. The drum rotates until it touches the paper. A transmission corona 48 transmits the toner particles from the photosensitive drum 43 to the carrier or the paper 49. The toner particles 37 are fused in the fibers of the paper 49 by the fuse station 51. The remaining toner particles on the drum are removed by the cleaning station 50.

The development forces are proportional to the difference in potential between the photosensitive surface of the drum 43 and the magnetic brush. The larger this difference, caused by locally increased illumination on a microdot, the more toner particles will be transmitted from the magnetic brush to the microdot.

The toner particles have a diameter of approximately 7 micrometer. An electrophotographic printer with an addressability of 600 dpi has microdots having a side of 42 micrometer. 36 toner particles can be put side by side on one microdot. The maximally desired density is obtained if the microdot gets about the double of this amount, being 72 toner particles. The physical properties of the rendering system and the toner are established such that this situation is obtained for maximal illumination of the photosensitive drum. If the drum is poorly illuminated, caused by a small energy level applied to the electro-optical rendering system, then the potential difference will be too small to deposit even one single toner particle on the drum. From a specific energy level off, sometimes none, sometimes one, sometimes two or more toner particles will be deposit on the drum. The amount of toner particles deposit on a microdot having a specific potential level, also depends on the charge distribution in the neighborhood of this microdot. This is surely the case for small potential differences. Proportionally to this difference, the number of toner particles, transmitted to the drum will increase. The charge distribution in the neighborhood of the microdot influences less this number, and moreover the density increment per extra toner particle will be less, as the microdot becomes more and more covered, because the toner particles start covering each other.

Figure 2:
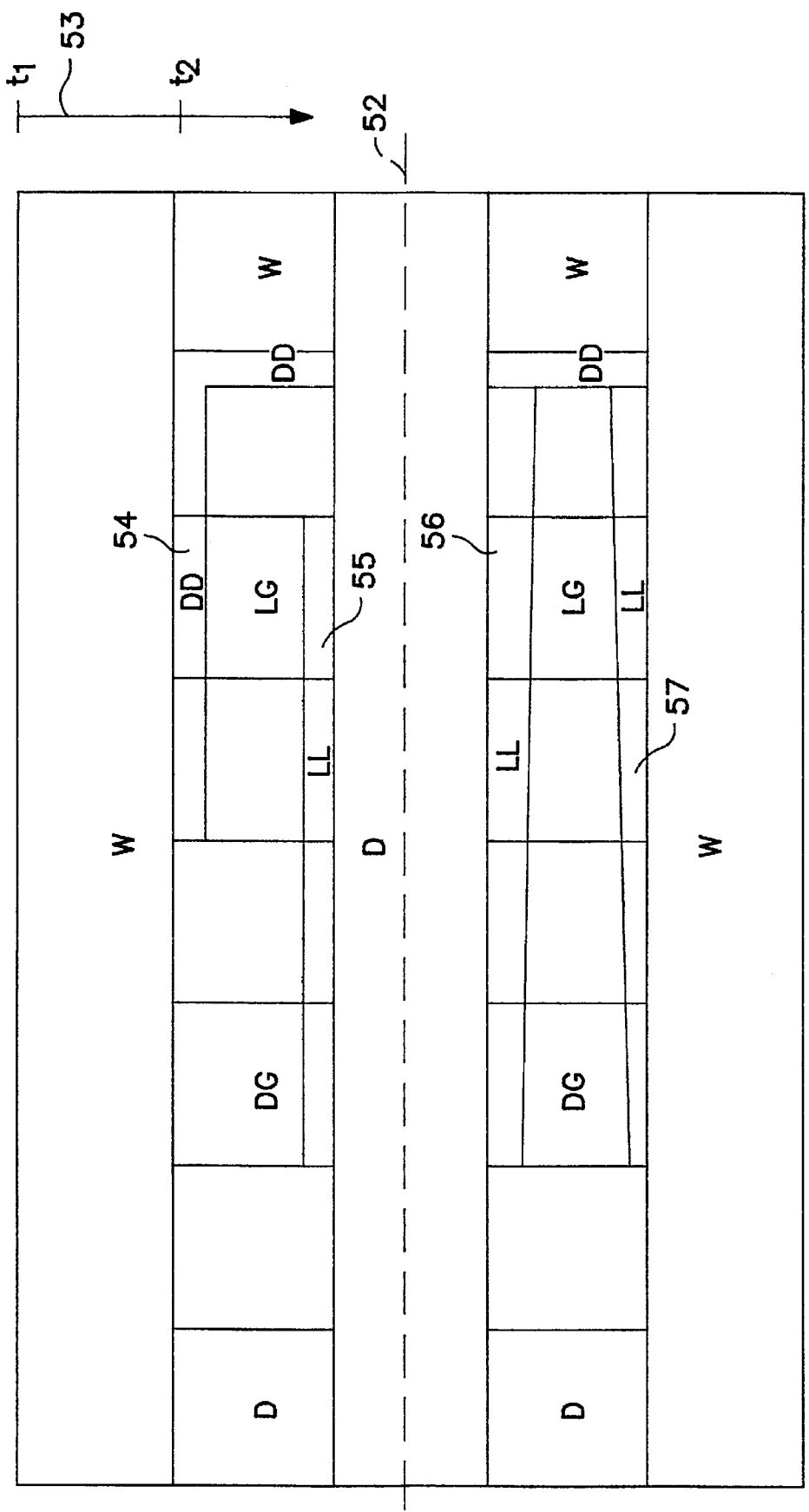
FIG. 2 is a test pattern for the determination of stable energy levels.

In the test pattern of FIG. 2, the influence of instabilities in the electrophotographic process is shown. The solid bold lines and the fine lines are fictitious lines that delineate areas with equal energy level for all microdots within these lines and subareas with quasi equal density. De areas designated by W are White areas, obtained by driving with a low energy level. LG stands for Light Grey, DG stands for Dark Grey and D stands for Dark or black, obtained by driving all microdots enclosed by the solid bold lines with the highest energy level. The subareas, delineated by fine lines, are subareas that became, by artifacts caused by the electrophotographic process, a density which is different from the density of the areas to which they belong. Although the areas W, LG, DG and D are chosen symmetrically relative to the horizontal axis 52, the areas with differing density are not symmetrical with respect to the horizontal axis 52. The direction of rendering plays an important role here. On the time axis 53, the time $t_1$ occurs before the time $t_2$, in other words, the top side of FIG. 2 is written before the bottom side. At the transition 54 from White to Light Grey, a line appears having a width of about 0.2 mm. That line becomes a higher density (DD) due to the process. At the transition 55 from Light Grey and Dark Grey to Dark, a similar band appears, but with a lower density (LL). This LL band appears also in the transition 56 from Dark to Light Grey and Dark Grey. At the transition of Dark Grey and Light Grey to White, a very disturbing light density (LL) "ravel" 57 appears. This ravel is larger as the density of the region is low. Mainly this last phenomena must be avoided by combination of stable energy levels with non-stable energy levels. Therefore, we must determine the border between stable and non-stable energy levels. Moreover, for lower energy levels, we must determine from which energy level the density of a microdot is affected. This will be determined in the following two experiments.

First experiment

Figure 3:
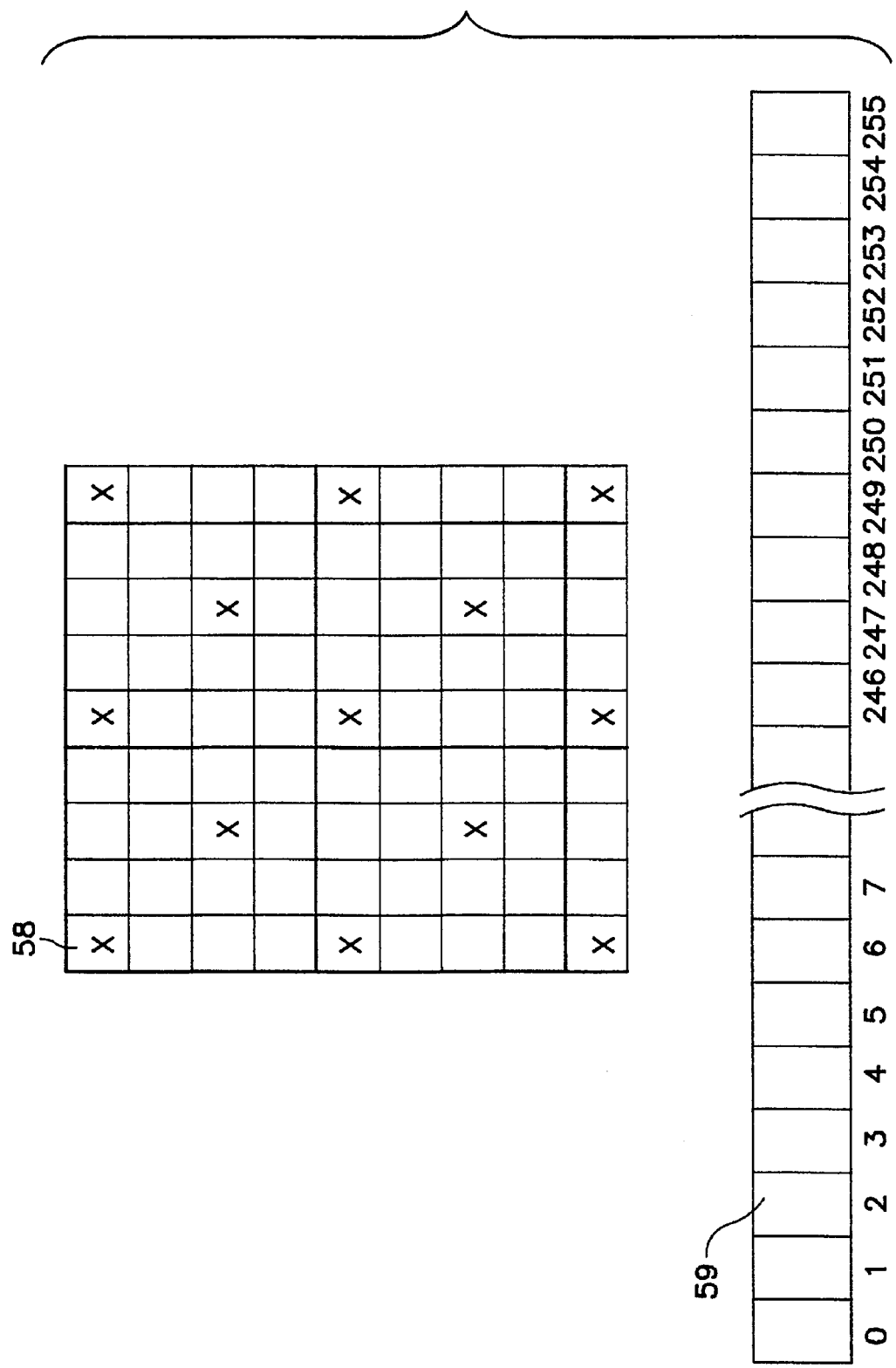
FIG. 3 is a test pattern for the determination of the first marking energy level.

The purpose of this experiment is to determine from which energy level the density is visible or thus the energy level is marking. In order to prevent the influence of neighboring microdots, only the microdots indicated by a cross 58 on FIG. 3 are driven. For a system with digital drive signals 0–255, a grey wedge 59 is imaged, as shown in FIG. 3 below. Visually it is established from which moment the density is different from the density of the blank carrier. The energy level corresponding to this position give the first marking energy level $E_2$.

Second experiment

The purpose of this experiment is to determine from which energy level the density on the carrier is "stable" in all circumstances. This behavior is importantly influenced by the position and the visual width of the ravel 57 in FIG. 2. In a grey wedge, such as shown in FIG. 2, with the finest possible energy distribution for the rendering system, the energy level $E_s$, for which the ravel is acceptable, is visually determined.

This experiment indicates that the exact limit between stable and non-stable energy levels is difficult to delineate, but the experiment clearly indicates that there are energy levels that incontestably belong to the class of stable energy levels and other energy levels that belong incontestably to the class of non-stable energy levels. For the Chromapress printer with 256 drive signal levels 0–255, on which the experiment was executed, all drive signal levels above 160 give a stable level, and all driver signal levels below 80 give a nonstable level.

Figure 4:
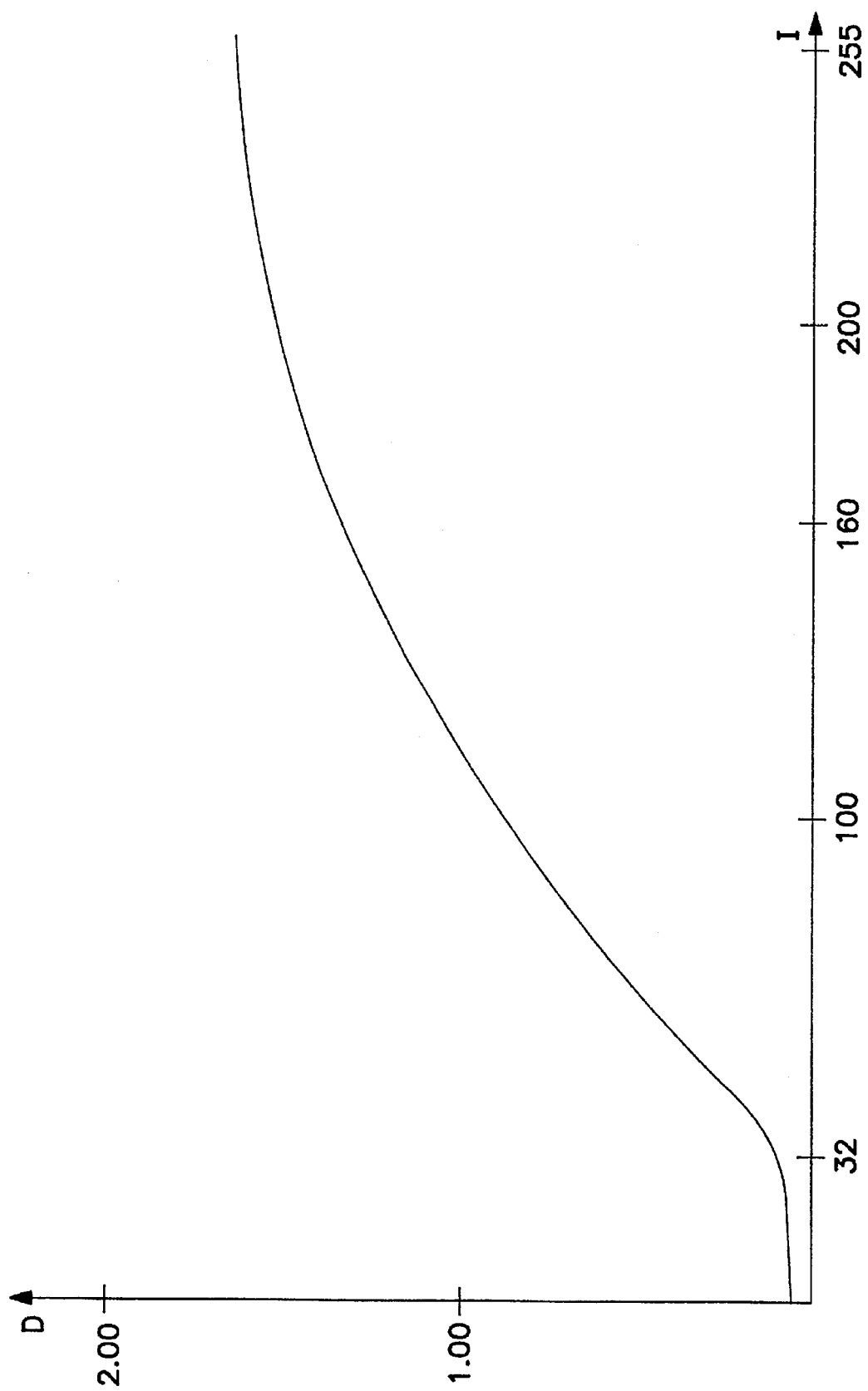
FIG. 4 is a curve that represents the density as a function of the image signal for a method without screening techniques.

If each pixel in the image information drives a microdot individually, by making use of each time the same non-compensated pixel tone curve, then an image having a poor useful density range is obtained on the carrier, as shown in the graph of FIG. 4. This graph shows the density as a function of the drive signal I, taken to be equal to the image signal. Drive signals or image signals I=0–31 give a very small density increment. Image signals 32 up to 160 give a largely differentiated density. Higher drive signal levels give a small density increment for the same drive signal increment.

Figure 5:
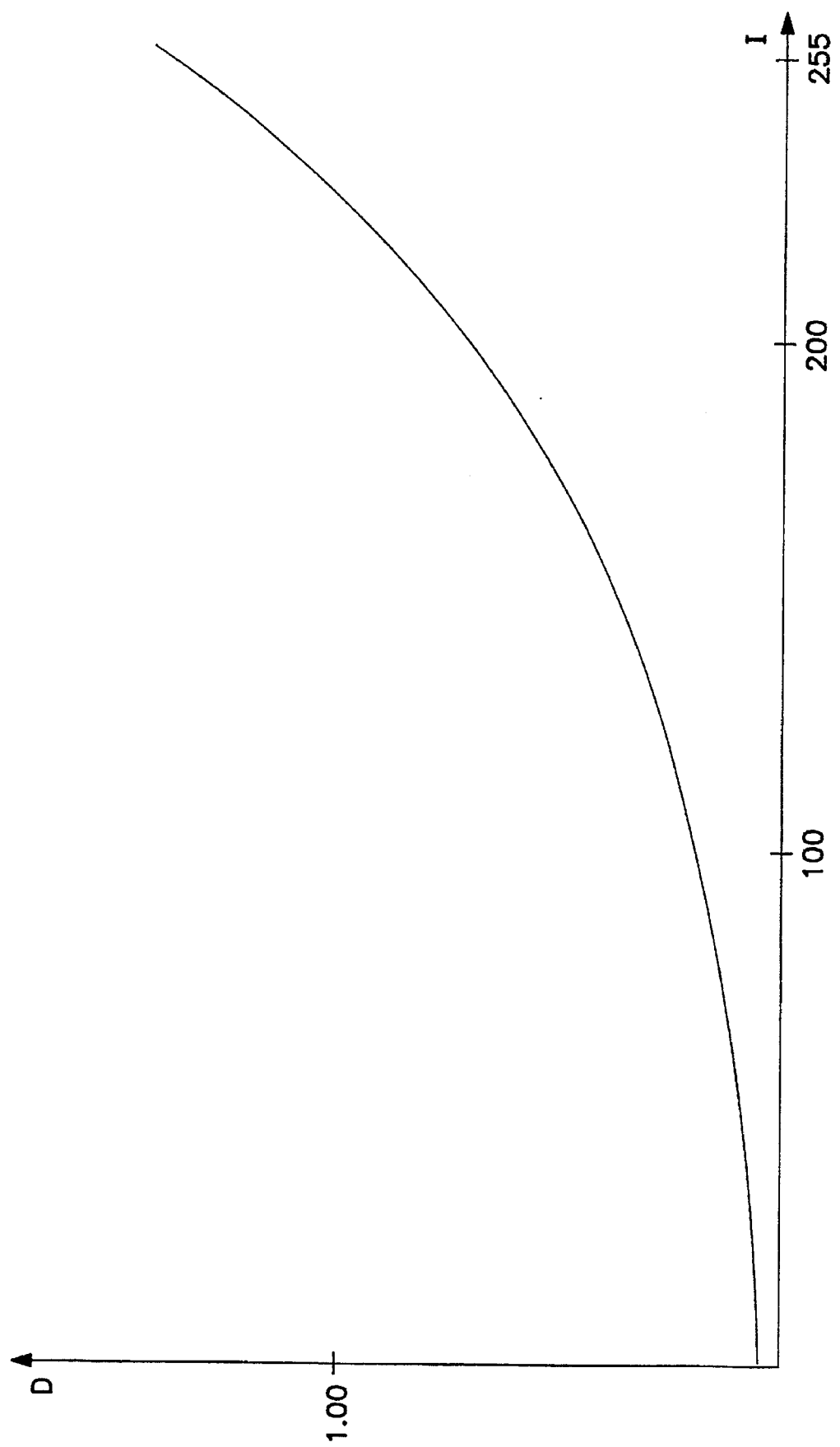
FIG. 5 is a curve that represents the density as a function of the image signal for optimal visual perception.

FIG. 5 gives the curve of visual perception for optimum image reproduction. This curve shows a uniform small density change in low density regions and a higher degree of density change in higher density regions, where the human eye is less sensitive for small density variations.

From this last graph, it is clear that a lot of low density levels must be reproducible in a stable manner. This is possible only by using screening techniques. This technique reduces the spatial resolution in favor of the density resolution. An individual microdot does not reproduce exactly the density that is required for the given image signal for the pixel corresponding to that microdot. The microdots are arranged into screen cells. For these screen cells, it is the purpose that the integrated density over all microdots in the screen cell approximate the required average density of the corresponding image segment.

The bigger the screen cell, in other words the more microdots belong to one screen cell, the more accurate this approximation can be established. This improved density resolution however reduces the spatial resolution. Therefore, the number of microdots M per screen cell is chosen as a function of the resolution of the rendering device, the required spatial resolution, the density resolution of the rendering system and the required density resolution for the image. The value for Mcan be selected to be 2, such that the microdots render two by two the required density. For a system having eight energy levels and a required image resolution of 256 density levels, a screen with 32 microdots per screen cell can be necessary.

Figure 6:
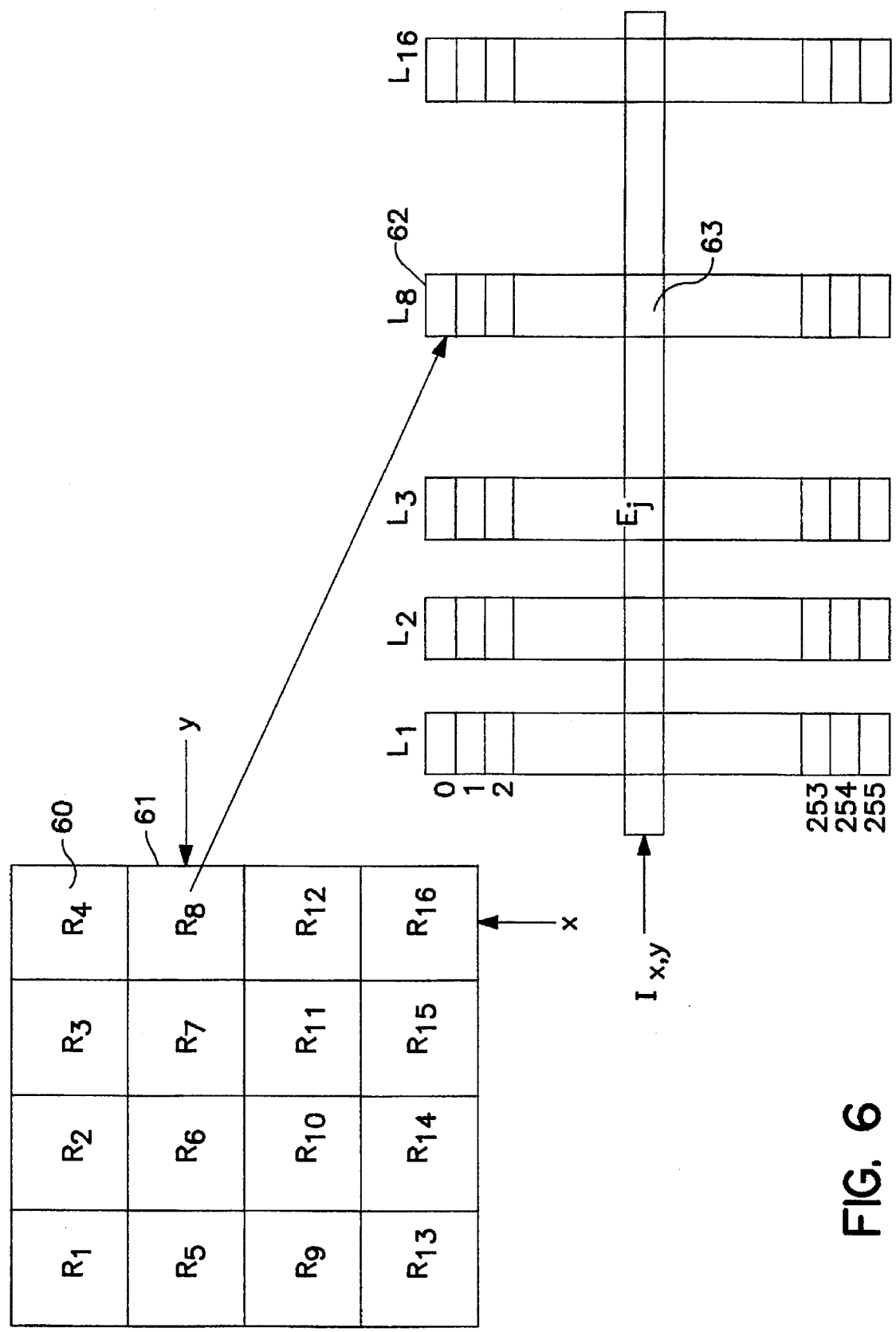
FIG. 6 is the composition of a screen cell by microdots and illustrates the screening process.

For this embodiment, as is shown in FIG. 6, a screen having sixteen microdots 60 per screen cell 61 has been chosen. Each microdot $R_j$ gets a different pixel tone curve $L_j$ 62, depending on the position of the microdot. The pixel tone curve is represented here as a table 62 for each microdot 60, having T=256 table entries, one entry per possible input signal $I_{*,*}$. The table value 63 is an energy level $E_j$ or a drive signal (energy level index) for one of the selected energy levels.

By selecting only the stable energy levels $E_1$, $E_s$ and higher up to $E_N$ for use as drive signals, it is impossible to reproduce the required amount of low density levels for optimal perception. This forces us to select between $E_1$ and $E_S$ a certain amount of non-stable energy levels, that can be used in combination with stable energy levels $E_1$ and $E_S$ or higher. It has no sense to select energy levels between $E_1$ and $E_2$, because the energy levels between those two levels are non-marking. The next energy level following $E_1$ is thus $E_2$. It has also no sense to select all possible energy levels between $E_2$ and $E_s$. It is sufficient to select the minimum amount of energy levels between $E_2$ and $E_S$, necessary to realize the small density increment—prescribed by FIG. 5—by an energy level increment in one microdot of the screen cell. In the current embodiment, implemented on the Chromapress system, the energy levels are selected equidistantly between $E_2$ and $E_S$.

Also between $E_S$ and $E_N$ a number of energy levels must be established, such that the required density increment for an image signal can be realized by an energy increment for one or more microdots.

Figure 7:
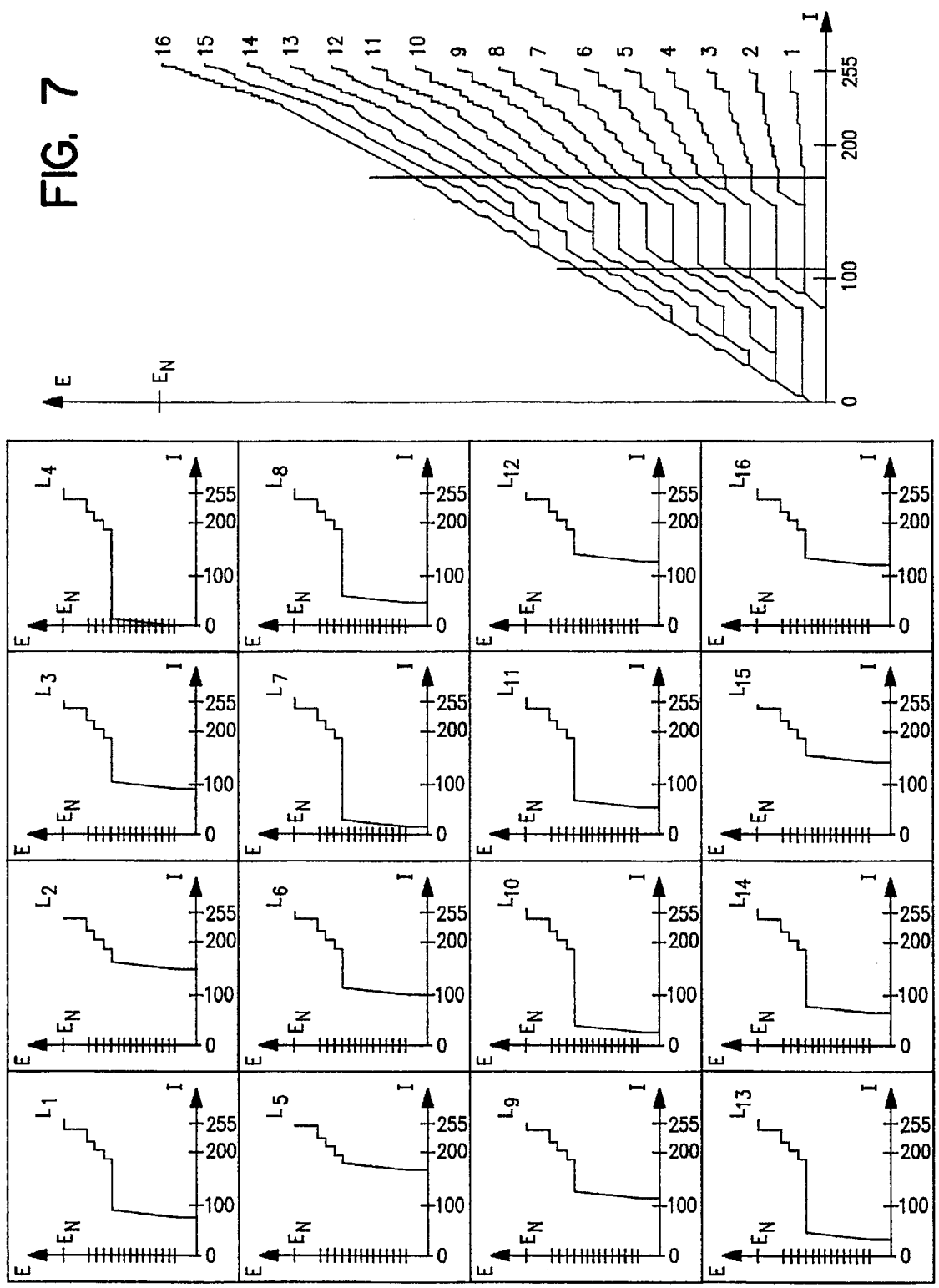
FIG. 7 gives a graphical representation of individual pixel tone curves in a 4×4 screen cell and the average energy level, averaged over the screen cell.

In FIG. 7, sixteen pixel tone curves are shown for a square screen cell, having four rows and four columns of microdots. At the right side, the average of these sixteen pixel tone curves is shown, together with their individual contribution. The topmost line represents the integrated density of one screen cell as a function of the drive signal I for all microdots in this screen cell having the same image signal I. The vertical distances between two consecutive lines give the contribution of each individual microdot in the screen cell to the final density of the whole screen cell.

It is clear that the pixel tone curve $L_4$ for the microdot $R_4$ first takes all non-stable energy level values for a short image signal interval, while the other pixel tone curves remain constant on the lowest energy level. As soon as the microdot $R_4$ arrives at a stable energy level $E_S$, the pixel tone curve $L_7$ gets the non-stable energy levels appropriated, until this pixel tone curve for the microdot $R_7$ arrives at the first stable energy level. The microdot $R_4$ remains at the stable energy level $E_S$ for all these image signals, while the other microdots remain at the non-marking stable energy level $E_1$. This goes on for all microdots in the following sequence: 4, 7, 10, 13, 8, 11, 14, 1, 3, 6, 9, 16, 12, 15, 2, 5, until all microdots are raised individually to a stable energy level. Then the first phase is finished.

As soon at all microdots reached a stable energy level, the second phase is started and the microdots get an increased energy level one after the other. The density increment for the image is thus uniformly distributed over the whole screen cell. This operation is advantageous for the spatial resolution.

It is clear that, in the second phase, the image signals are transformed to stable energy levels by all pixel tone curves. If necessary, the energy level $E_1$ can be involved, which has not been done for the current embodiment. In the second phase, care is taken that only two different stable energy levels are present in the screen cell that must render a constant image signal. Moreover, these two different energy levels are preferentially neighboring energy levels $E_j$ and $E_{j+1}$. This way, the rendering system is used at its highest possible spatial resolution.

In the first phase, for image signal levels that correspond to a density lower than a specific density $D_s$, the screen cell in the current example was arranged such that at most one microdot in the screen cell gets a non-stable energy level, in the case that all image signals for the microdots in a screen cell are equal. This can be seen from the cumulative graph in FIG. 7, at image signal level I=105. Only one pixel tone curve, at this signal level $L_6$, splits off. The curves having an index lower than 6 remain constant, those having an index higher than 6 follow parallely the curve $L_6$. The other microdots thus get a stable marking energy level $E_S$ or a stable non-marking energy level $E_1$. This is advantageous for the stability or reproducibility and the restricted density variance. Thus, for a specific image signal $I_{*,*}$, the microdots belonging to the screen cell can be divided into three sets. The microdots belonging to the first set have a pixel tone curve that transforms the specific image signal $I_{*,*}$ to a stable marking energy level $E_S$. . . $E_N$. The microdots belonging to the second set have a pixel tone curve that transforms the specific image signal $I_{*,*}$ to a stable non-marking energy level $E_1$. The microdots belonging to the third set have a pixel tone curve that transforms the specific image signal $I_{*,*}$ to a non-stable marking energy level $E_1$. As discussed above, the third set contains only one member, in the example given for $I_{*,*}$=105, the microdot is $R_6$. Preferentially, the specific density level $D_S$ is selected to be that density level that is obtained by driving all microdots with the first stable energy level $E_S$.

For this embodiment, applied to the Chromapress system, the following drive signals for the energy levels were chosen:

$E_1=0$ $E_2=41$ $E_{3,4,5,6,7,8,9,10,11}=53, 65, 77, 89, 101, 113, 125, 137, 149$ $E_{12}=E_S=162$ $E_{13,14,15}=178, 194, 210$ $E_{16}=E_N 255$

As soon as the screen cells have more microdots, it is advantageous to allow more than one non-stable energy levels per screen cell. This is especially the case if—in order to increase the spatial resolution—the number of halftone dots per screen cell is increased. A halftone dot is a contiguous group of marking microdots within one screen cell. Preferentially, each halftone dot comprises at most one non-stable energy level for any intensity level $I_{x,y}$. In a preferred embodiment, the amount of microdots per screen cell having a non-stable energy level must not become higher than a specific percentage of total amount of microdots in the screen cell or marking microdots. Preferentially, the ratio of microdots belonging to the first set to the microdots belonging to the first and/or second set must not be higher than 15%.

For image signal levels, for which not all the pixel tone curves reached the first stable energy level $E_S$, it is advantageous to keep the maximum energy level to the level $E_S$ for the microdots with highest density. This also improves the spatial resolution.

Figure 8:
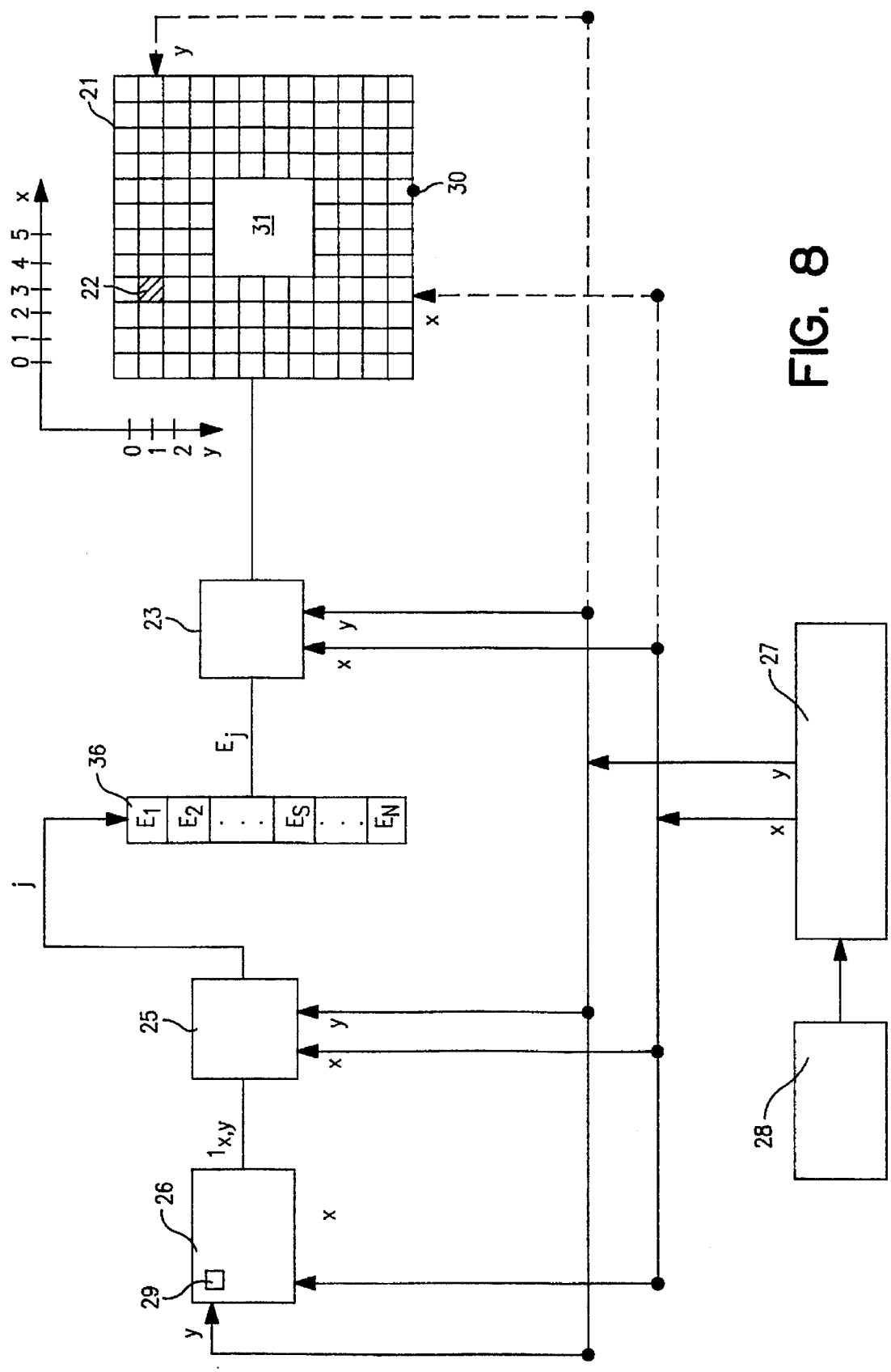
FIG. 8 is a schematic representation for the transformation of an image signal to a density.

Once the pixel tone curves are established, the screening process can start. This is done as shown in FIG. 8. A clock signal generator 28 generates a clock signal having a frequency determined by the physical characteristics of the rendering device 23. This clock signal is transmitted to an address generator module 27. At the rhythm of the incoming clock signal, the address generator module 27 generates simultaneously a signal x and a signal y. At each new clock pulse, another combination (x,y) is established. Each such combination corresponds with an address of the microdot 22 on the carrier 21. The signals x and y are transmitted to the image signal memory unit 26, to the screening unit 25 and to the rendering unit 23. When the image signal memory module 26 receives the signals x and y from then address generator module 27, module 26 will address a pixel 29—which determines the density of the microdot 22—with the address (x,y) and will apply the image signal $I_{x,y}$ for this pixel to the screening unit 25. The screening unit 25 receives three signals: the image signal $I_{x,y}$, x and y. These three signals determine—as we will discuss in conjunction with FIG. 6—one energy index signal j, that can get a value from 1 to N. N is the number of selected energy levels. This energy index signal j, generated by the raster unit 25, is applied to an energy level module 36. This module 36 applies an amount of energy, having energy level $E_j$ dependent on the value of the energy index signal j, to the rendering system 23. The rendering system thus receives from the address generator module 27 the address signals x and y, and from the energy level module 36 an amount of energy. As described in conjunction with FIG. 1, this energy is converted to a density level on the microdot 22, for which the location on the carrier is determined by the signals x and y.

In FIG. 6 is shown how the screening unit 25 generates an energy index signal from the three signals x, y and $I_{x,y}$. The screening unit 25 has a processor unit that computes, from the combination of signals x and y, a microdot index signal from 1 to M, wherein M represents the number of microdots per screen cell. In this example, M ranges from 1 to 16. The microdot index signal i represents the index for a microdot $R_i$, as represented in FIG. 6. The screening unit 25 further contains a memory module, in which the pixel tone curves are stored under the form of digital signals representing the energy index signal. The memory module is organized such that by addressing it with microdot index signal i and the image signal $I_{x,y}$, the energy index signal j becomes available for processing in the energy level module. From this description it is clear that the pixel tone curves can be arranged in a two-dimensional array or look up table (LUT). It is possible however to establish different organizations such as a three-dimensional LUT, in which the signals (x,y) establish a relative position (r,s) of the microdot within the screen cell, and the triplet $(r,s,I_{x,y})$ is the entry for a three-dimensional LUT. This way the energy level index j is produced. Another embodiment can store N−1 image signal threshold levels for each microdot in a screen cell. By successive comparisons of the image signal with these image signal threshold values, the energy index signal is established.

Figure 9:
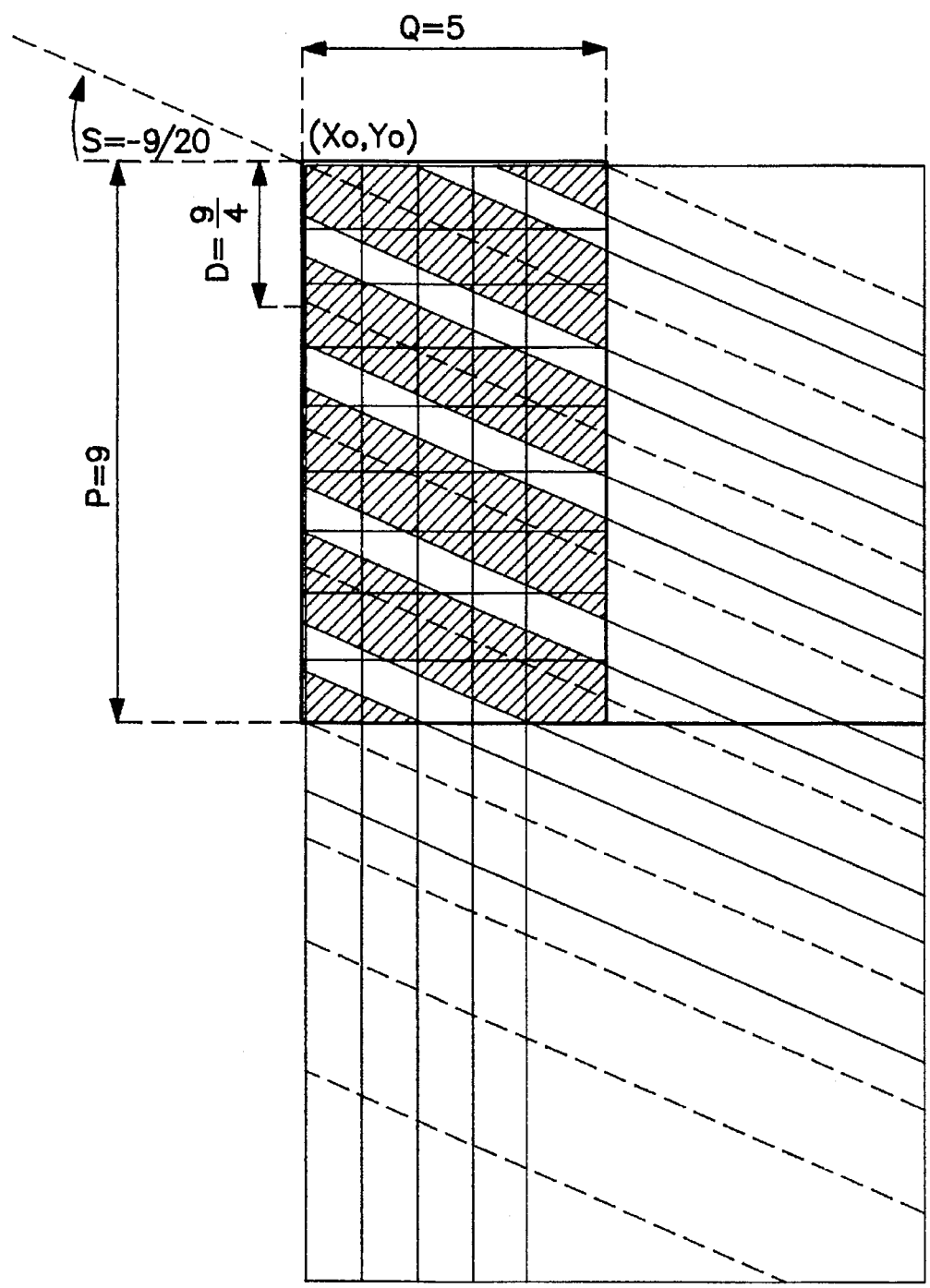
FIG. 9 gives the construction of a band pattern in a screen cell.

For the second embodiment, we refer to FIG. 9. In this figure, rectangular screen cells are built having P rows and Q columns of microdots. In the screen cell is attempted to reproduce a band or a slanted line with finite width as faithfully as possible. In the book "Fundamentals of Interactive computer graphics" by Foley and Van Dam, published by Addison Wesley, Reading in 1984, an algorithm is described to represent such a band on a monitor screen. To represent such a band on a grid of microdots with variable density, the density of a microdot is made proportional to that part of the surface of the microdot that is covered by the band to be represented. In FIG. 9, a set of bands, passing over the screen cell, are represented by hatching. The areas common to some microdots and hatched bands are outlined by a bold line. If the microdot is fully contained within the band, then this microdot gets the highest required density. If the microdot is covered only for about 50%, as for the microdot in the bottom left corner of the screen cell, then this microdot gets a density that is half the highest required density.

A band is characterized by a point on its center line, a slope and a width or—for slanted and horizontal lines—a vertical height. If we select the vertical height of the band proportional to the required density for the whole screen cell, then we can describe the method as follows:

— generate a periodical pattern of center lines on the carrier, having the same slope and equal distance between each other;

— select a pixel in the image information, that corresponds to a microdot on the carrier. Superimpose on each center line a band, the width of which being proportional to the density required for the microdot. The density required for the microdot is determined by the image signal of the pixel and the perception curve, giving the relation between the image signals and the density. For the image signal that corresponds with the smallest density level on the carrier, the width of the band is zero. For an image signal that corresponds with the highest required density on the carrier, the width of the band equals to the distance between two center lines;

— compute the area of the microdot, covered also by any band;

— assign to the microdot a density that is proportional to the computed area. If the computed area is zero, in other words if the microdot has no common area with any band, then the microdot gets the smallest density on the carrier. Is the microdot completely situated within one band or if all bands are connected, then the microdot gets the highest required density on the carrier.

The implementation of this method is done analogously to the preceding method. For each microdot of the screen cell, a pixel tone curve is created. This pixel tone curve is applied in an identical way as described in FIG. 8.

The slope S is the tangent of the angle, indicated by the arc in FIG. 9. In our embodiments, S is a rational number. This means that S can be written as the ratio of two integer numbers. Preferentially, these two integer number are small, after reducing the fraction to its lower terms. This way, the screen cell is also small.

The same applies for the vertical distance D, which is always a rational number in our preferred embodiments.

For the creation of the pixel tone curves, the following elements must be known:
  —the number of rows P and the number of columns Q of microdots within the screen cell;
  —the slope S of the center lines. This is the tangent of the angle between the center line and a horizontal line;
  —the position $(X_0, Y_0)$ where one center line passes through. This position determines the location of the screen relative to the center lines;
  —the vertical distance D between two consecutive center lines.

FIG. 9 is composed based on the assumption that the microdots are square and that they have a length 1. The other attributes are: P=9, Q=5, S=−9/20, D=9/4 and the requirement that one center line passes through the upper left corner of the screen cell.

For each of the 9×5=45 microdots, a pixel tone curve can be computed by establishing the width of the bands for each possible value of the image signal, by computing the common area between the bands and the microdots, determining the density and the corresponding energy level that causes this density.

Figure 10:
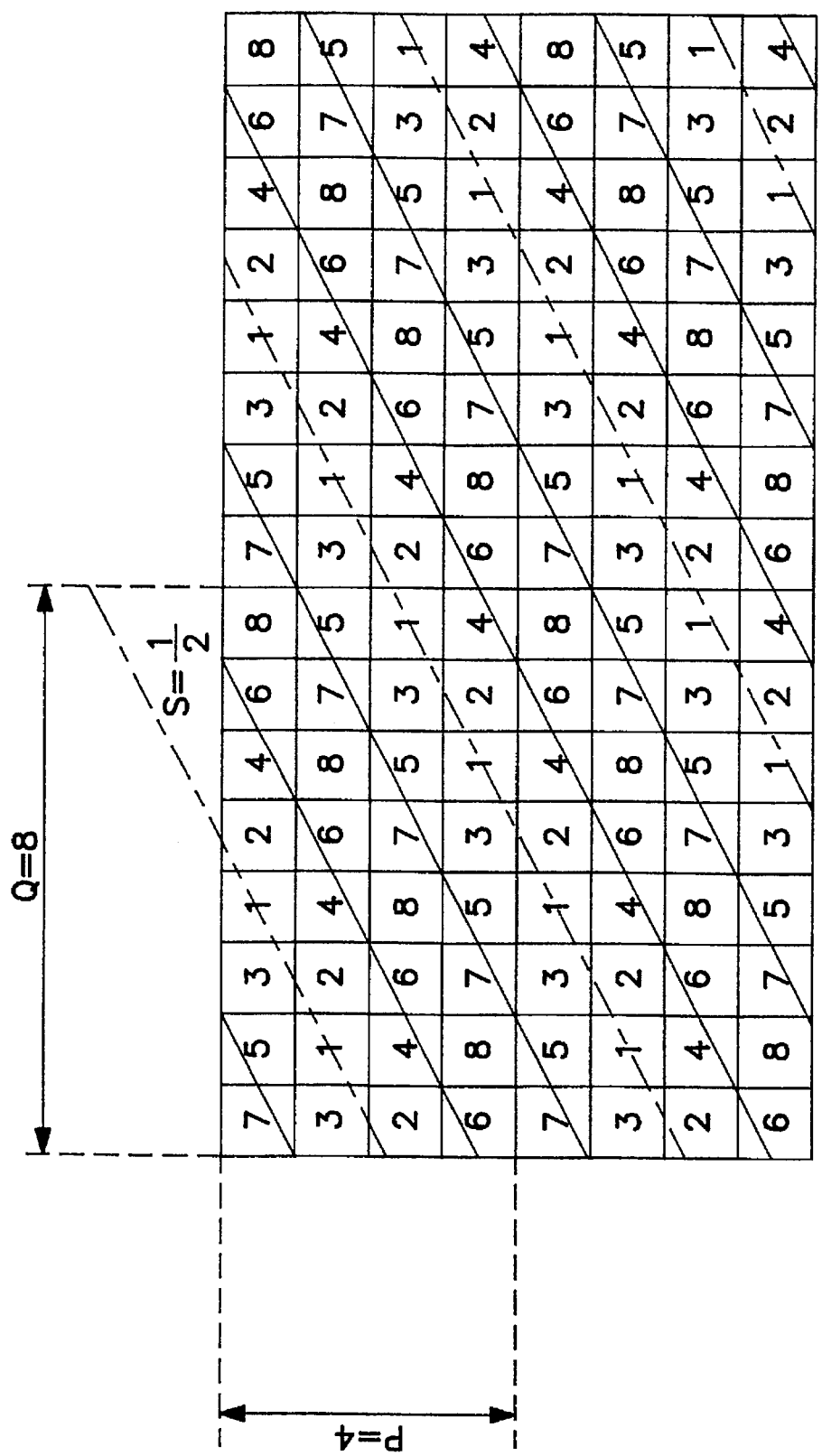
FIG. 10 gives the construction of a band pattern in another screen cell having equivalent microdots.

In FIG. 10 a second example for this embodiment is shown, having the parameters: P=4, Q=8, S=½, D=4 and the center line passes through the center point of the fourth microdot on the first row of the screen cell. In this figure, it is obvious that the area covered by the bands in all microdots numbered with number 4 is equal. It is also obvious that the microdots numbered 5 have a covered area equal to that of the microdots having number 4. The microdots 4 and 5 thus have identical pixel tone curves and therefore are called equivalent pixel tone curves. There are only five non-equivalent microdots: 1, 2+3, 4+5, 6+7 and 8. For lower densities, a pixel will give the most important contribution to microdots having number 1. As the density increases, the contribution to microdots having numbers 2 and 3 increases. For even higher densities, the contribution is assigned first to microdots 4, 5, then to 6, 7 and finally to 8. The specific contribution is most often equally distributed over eight microdots; for microdots 1 and 8 over four microdots within the screen cell.

Figure 11:
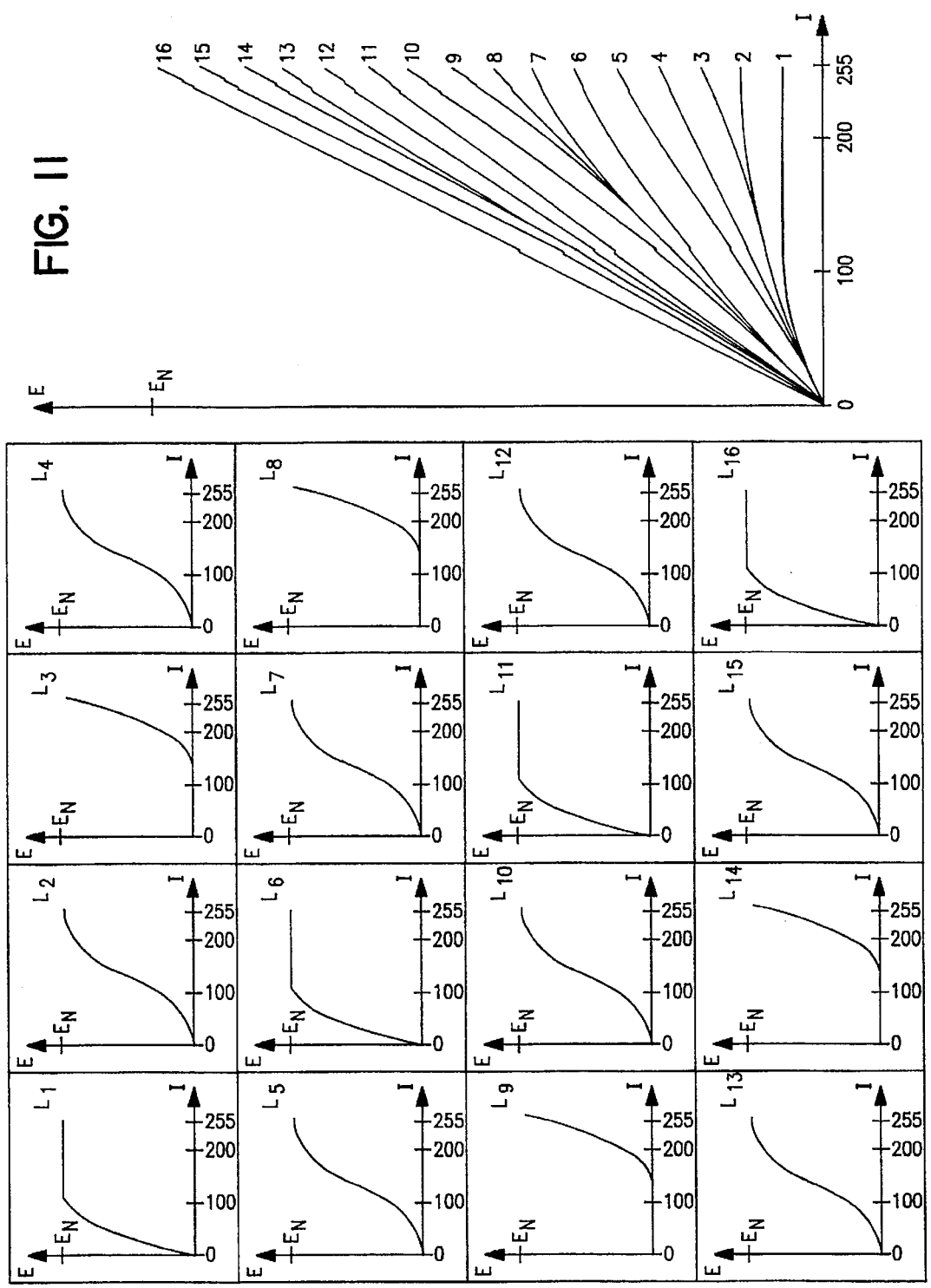
FIG. 11 gives pixel tone curves for the band method in a 4×4 screen cell, wherein only three different pixel tone curves are present.

In FIG. 11, pixel tone curves are shown for a screen cell with P=4, Q=4, S=1 and D=4. Here only three out of sixteen pixel tone curves are different between each other.

Figure 12:
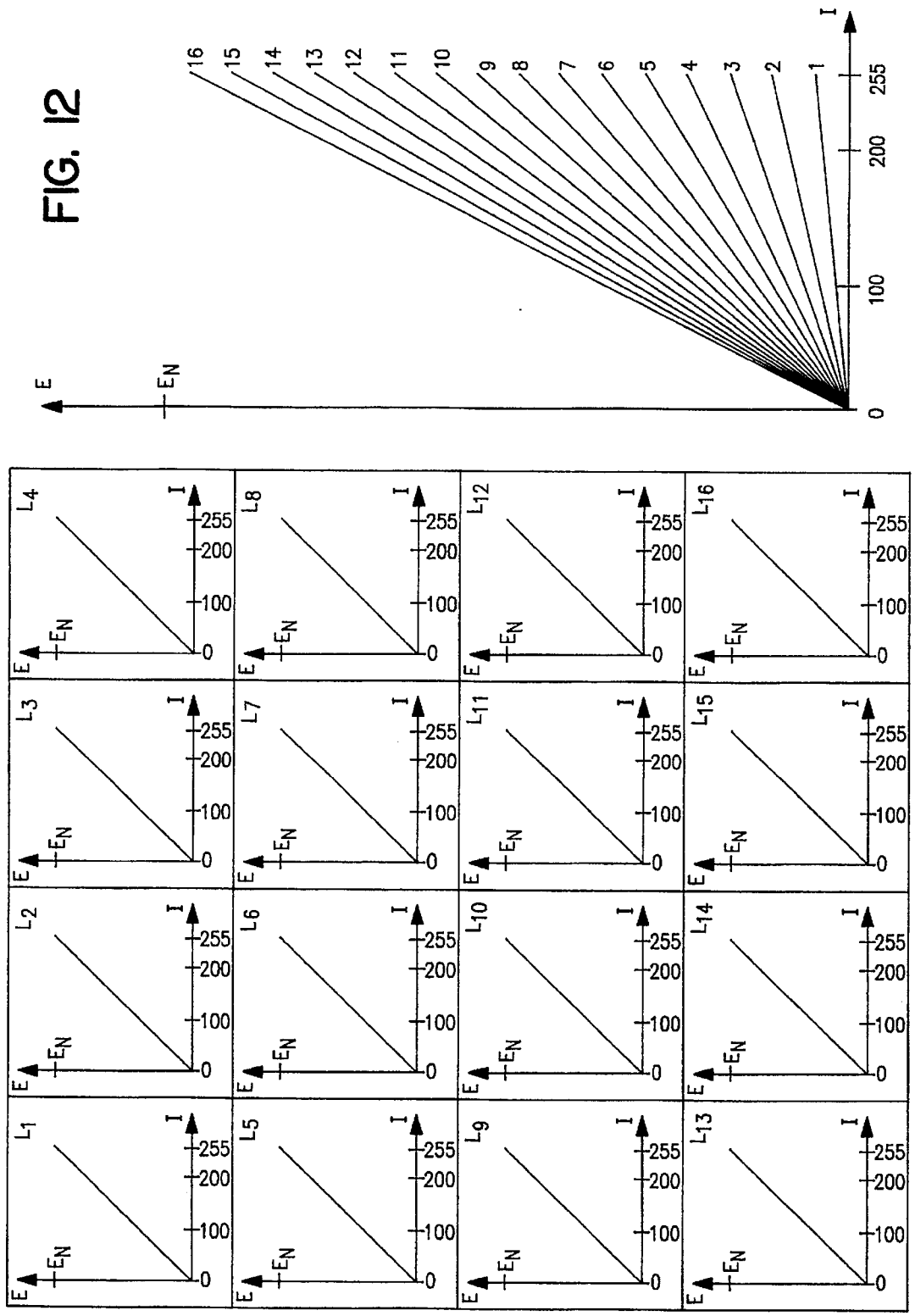
FIG. 12 is a representation of completely identical pixel tone curves.

In the extreme case, all pixel tone curves can be made equal to each other. In FIG. 12 the pixel tone curves for this situation are sketched. In that case, the division of microdots in screen cells has no effect and the rendering system is used at its full density resolution. This is acceptable for high densities with stable energy levels, but gives problems for low density levels, where non-stable energy levels are used.

Figure 13:
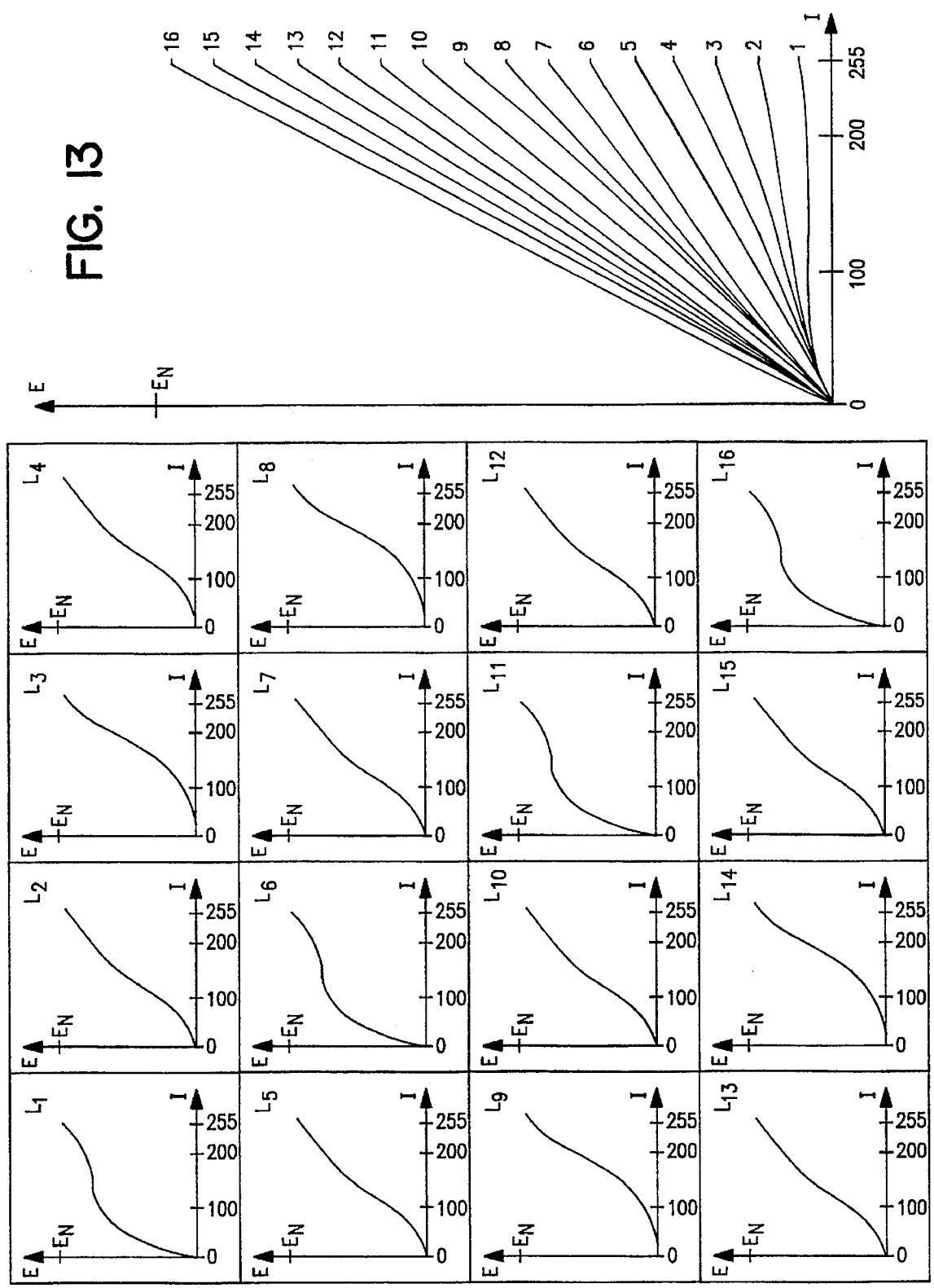
FIG. 13 is a representation of a mix obtained from FIG. 11 and 12.

Because of these reasons, it is advantageous to use a mixed mode between the above described method to create pixel tone curves and the situation where all pixel tone curves are equivalent. For low densities, the method with non-identical pixel tone curves must get the highest weight. For higher densities, the method with identical pixel tone curves is most useful. In FIG. 13, we show the pixel tone curves for an implementation wherein the influence of the first method (FIG. 11) decreases linearly as a function of the level of the image signal, and the influence of the second method (FIG. 12) increases linearly. If the pixel tone curves in FIG. 11 are represented by $L_i$ and the pixel tone curves in FIG. 12 are represented by $K_i$, then the pixel tone curves in FIG. 13 can be represented by $C_i$, where $C_i$ is a weighted sum of $L_i$ and $K_i$. Such a weighted sum can be mathematically represented by:

$$C_i = w_i * L_i + v_i * K_i$$

Care must be taken that the cumulative sum of the identical pixel tone curves $K_i$ equals to the cumulative sum of the different pixel tone curves $L_i$, such that by this operation no general density change is introduced. Moreover, the sum of the weights $w_i + v_i$ musk always equal to one. Preferentially, the weights $w_i$ (and thus also $v_i$) are not constant for all pixel tone curve entry numbers i, but vary according to the entry number i, or the image signal level $I_*$, $_*$. A proper choice is that $w_i$ varies in a linear way according to the value for $I_*$, $_*$.

Other mixed modes can be imagined, for which the weights are not a linear function of the image signals.

Figure 14:
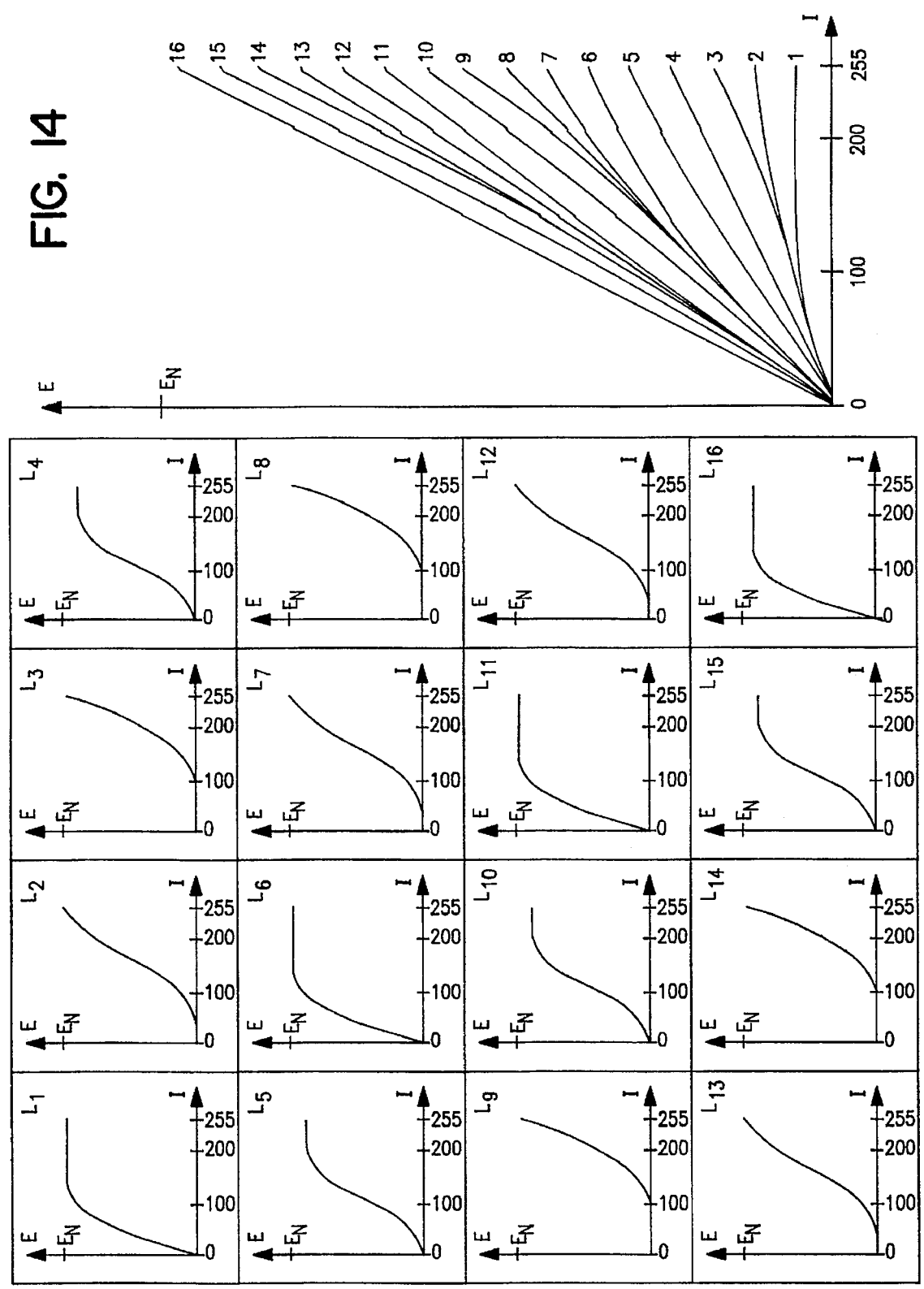
FIG. 14 represents the same band method as FIG. 11, wherein the center lines are slightly offset.

The fact that microdots are equivalent, reduces the amount of different densities that can be reproduced by a system having a reduced set of energy levels. Therefore, one can select a situation that—although the screen cell parameters are nearly identical—results in less equivalent microdots. This can for example be realized by modification of the position of the point $(X_0, Y_0)$, that is traversed by one center line. In FIG. 14 the pixel tone curves are shown for a 4×4 screen cell with S=1 and D=4, wherein the center line does not pass through the center of the microdot in the upper left corner of the screen cell. The center of the microdot a downward translation over a quarter microdot. Also this method can be mixed with the method for identical pixel tone curves. Both embodiments where the center line traverses a microdot center and where the center line is translated have advantages. The first situation has the advantage that usually more pixel tone curves are equivalent, and that thus less pixel tone curves must be stored, if they are addressed by an extra indirection. The second situation has the advantage that there is a priori a certain differentiation, which is sometimes necessary to arrive at enough different integrated density levels on the carrier.

Another way to reduce the degradation in equivalent microdots, is to allot different perturbations to the pixel tone curves per microdot. These perturbations must be such that the net effect for the whole screen cell does not introduce a density change. This can preferably been done by compensating the perturbations, induced to a pixel tone curve, on a pixel tone curve from an equivalent microdot. If more microdots in a screen cell are equivalent with respect to each other, the perturbations are preferably compensated in the microdots closest to the perturbated microdot. More remote pairs of equivalent microdots can get the same or a different perturbation.

Figure 15:
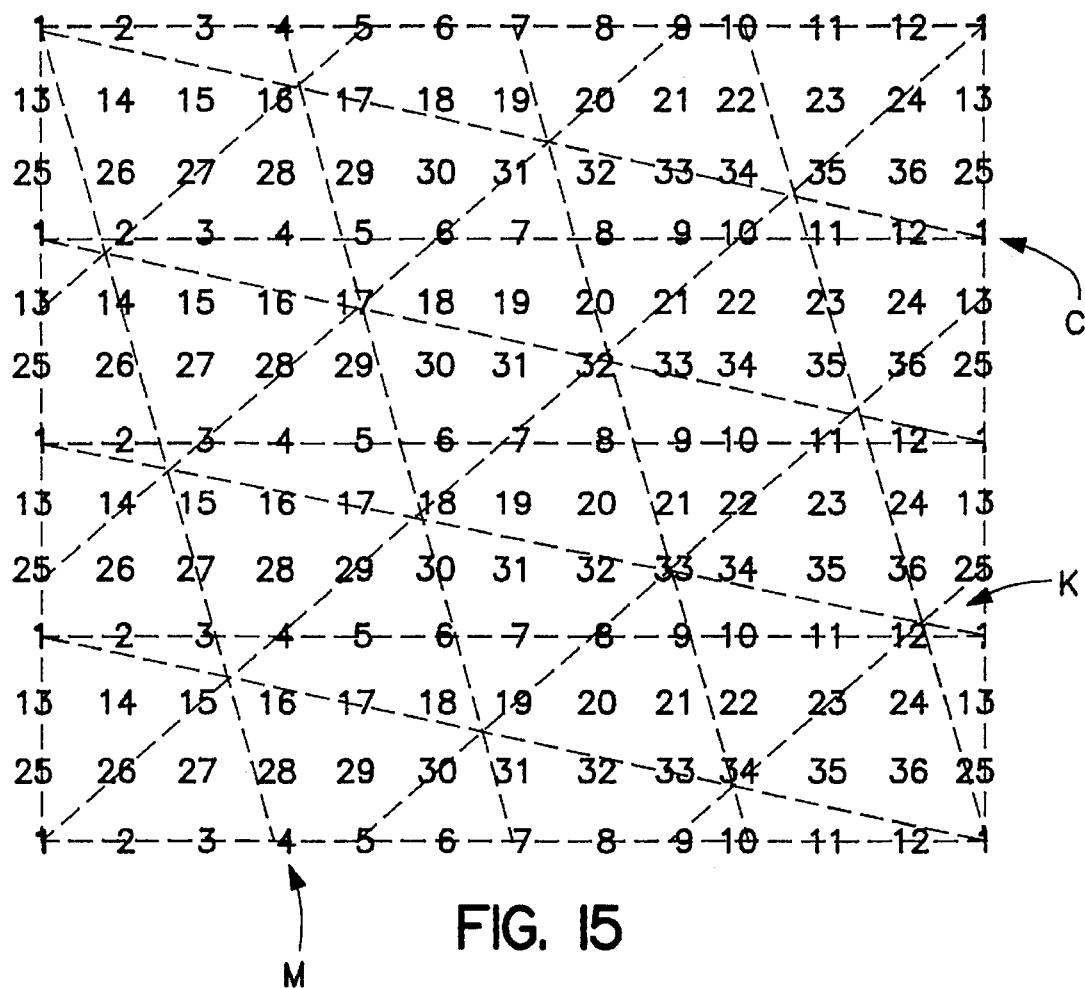
FIG. 15 shows a combination of bandlike screens, suitable for color applications.

This method is very advantageous for the reproduction of images composed of a plurality of color components. Registration errors of the carrier with respect to the rendering system are the source of many unwanted color changes for many screening techniques. The band pattern in this screening method reduces the sensibility for registration errors. For every color component, another slope S for the center lines is chosen. Another object is to reduce second order Moire, by techniques as described in the U.S. Pat. No. 5,155,599. For different colors, preferably a set of screens shown in FIG. 15 is selected, having the following parameters:

K : Black : P=4, Q=4, S=1, D=4
C : Cyan : P=3, Q=12, S=-¼, D=3
M: Magenta: P=12, Q=3, S=-4, D=12
Y: Yellow: P=4, Q=4, S=-1, D=4 (Not shown in FIG. 15)

Although the biggest screen cell contains 36 microdots, only six different pixel tone curves must be stored. The equivalent cells must refer to the same pixel tone curve.

Figure 16:
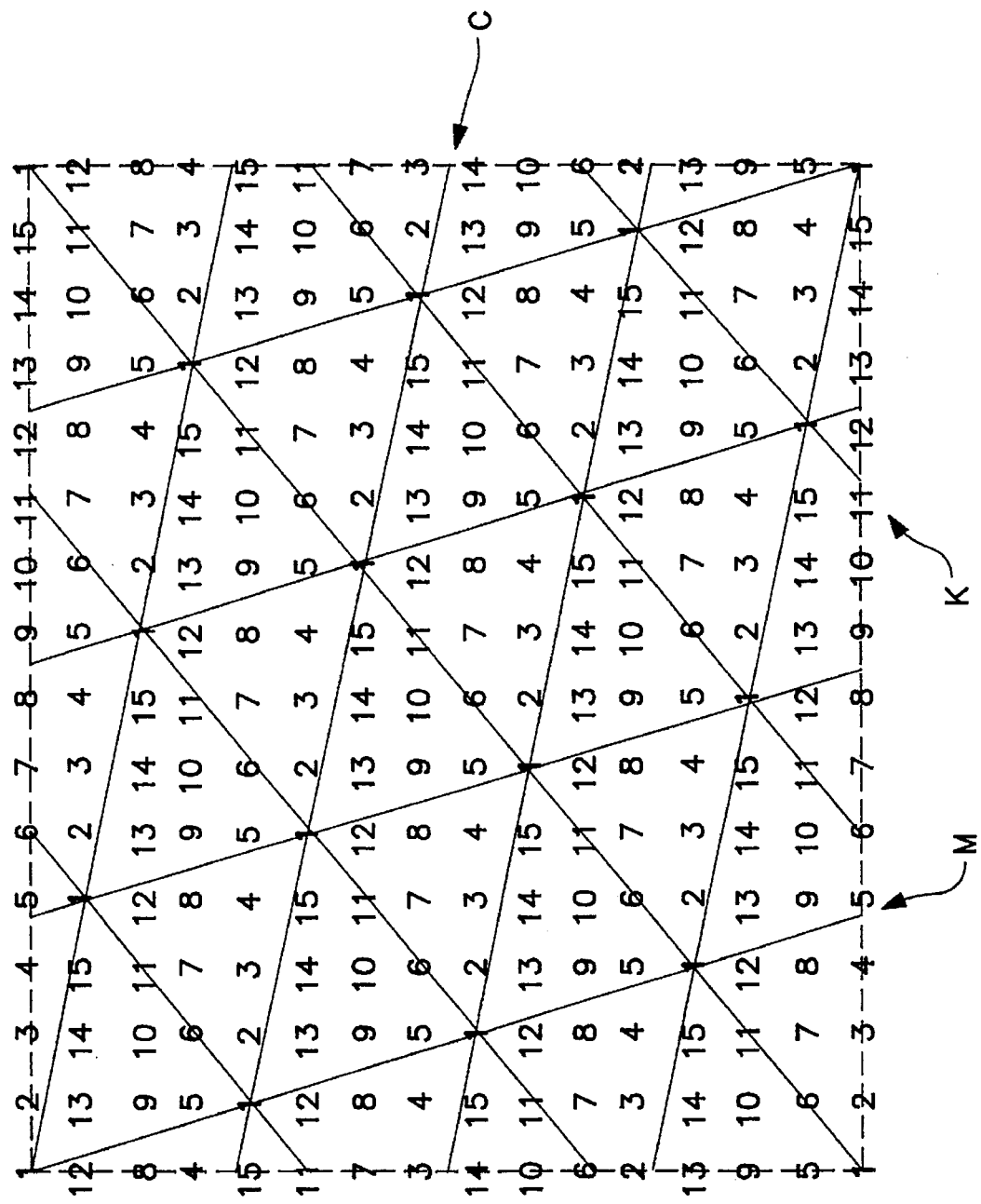
FIG. 16 is analogous to FIG. 15 but is composed of as little as fifteen non-equivalent pixel tone curves.

In FIG. 16, a screen cell is shown having 15×15 microdots. The three color components have a screen cell with rational tangents for the slope and rational distances between the center lines of the parallel bands. The parameters for this embodiment are as follows:

K : Black : P=15, Q=15, S=1, D=5
C : Cyan : P=15, Q=15, S=-¼, D=15/4
M : Magenta: P=15, Q=15, S=-4, D=15
Y: Yellow: P=15, Q=15, S=-1, D=5 (Not shown on FIG. 16)

Analysis of FIG. 16 reveals that only fifteen different pixel tone curves are required for 225 microdots.

Figure 17:
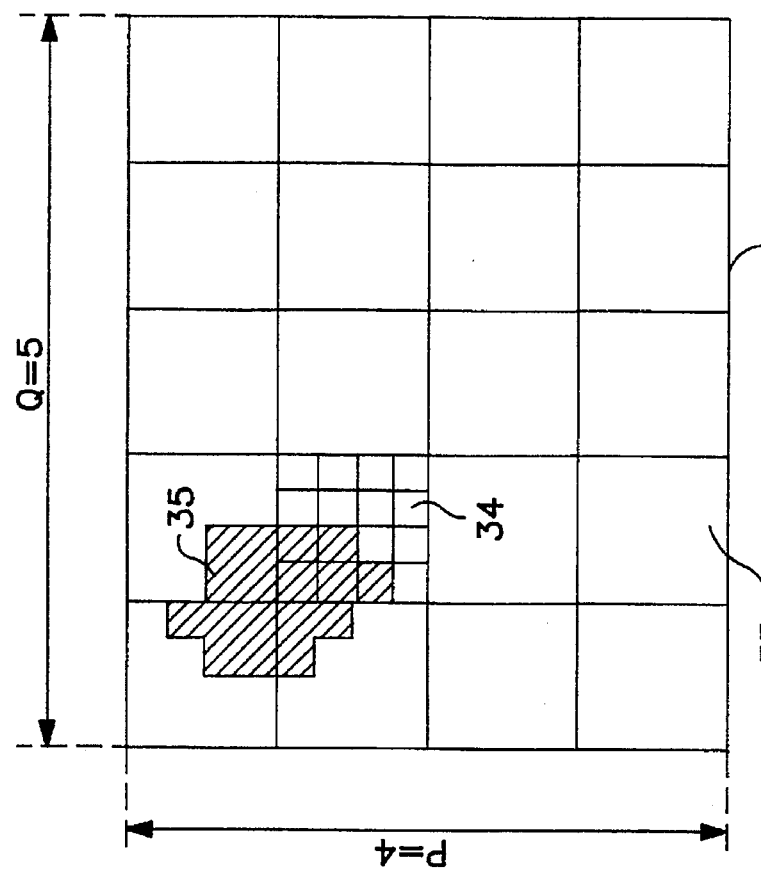
FIG. 17 is the superposition of a binary screen and a multilevel screen.

A third embodiment starts from whatever existing binary screening technique for a—maybe even fictitious—rendering system having high resolution. In FIG. 17 a screen cell 24 is shown with P=4 and Q=5 real microdots 33 for a rendering system having a plurality of energy levels. Each real microdot 33 comprises sixteen (4×4) fictitious microdots 34 of a binary rendering system having a spatial resolution that is four times higher. The fictitious microdots 34 are organized in a fictitious screen cell 24, having 20×16=320 fictitious microdots 34. Within the fictitious screen cell 24, fictitious halftone dots 35 can be established for each image signal. These fictitious halftone dots 35 contain an amount of fictitious microdots 34, that all belong to one real microdot 33. This amount corresponds to a specific density, that determines the energy level for said real microdot 33. In a simplified version, one can count the amount of marking fictitious microdots 34 per real microdot 33, and use that as energy level index. In the example in FIG. 17, the microdot on the second row, second column of the screen cell would obtain the index 5.

Figure 18:
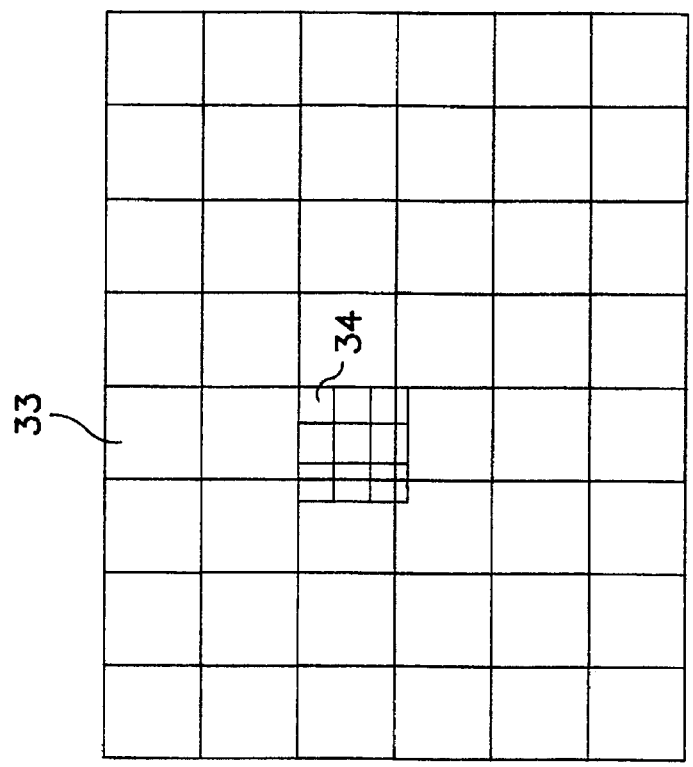
FIG. 18 represents the same as FIG. 17 but the microdots of the binary screen do not fit an integer number of times in a microdot of a multi level screen.

In FIG. 18 a situation is shown wherein the real microdots 33 do not cover entire fictitious microdots 34. In that case, the fictitious microdot contributes proportionally to the fraction of the area of the fictitious microdot 34, covered by the real microdot 33. In FIG. 18, four fictitious microdots fully contribute, four fictitious microdots Contribute for half and one only for one fourth.

The above described multilevel halftoning techniques can be incorporated in graphic language interpreters, such as PostScript (trade mark of Adobe Inc.) and AgfaScript (trade mark of Agfa-Gevaert A.G. in Leverkusen, Germany). Such interpreters get commands in a page description language format to reproduce text, graphics and images on a monitor or hardcopy device. In such an interpreter system, the pixel tone curves can be stored as described above in a two or three dimensional array. The microdot location indicates which pixel tone curve must be selected. The image signal level I is used directly to index the selected pixel tone curve or LUT. From this indexing operation, the energy level index results. In another implementation, a series of threshold matrices is built. Such threshold matrices can be derived for example from the pixel tone curves as described above. For every pixel in the input image, the image signal value is compared against the threshold values associated with the corresponding microdot. Once the interval is found where in between the image signal value is located, the energy level or energy level index that corresponds to this interval is also known.

Although the present invention has been described with reference to preferred embodiments, those skilled in the art will recognize that changes may be made in form and detail without departing from the spirit and scope of the invention.

21. Carrier
22. Microdot
23. Rendering system
24. Screen cell
25. Screening unit
26. Image signal memory module
27. Address generator module
28. Clock
29. Pixel
30. Screen
31. Screen cell
32. Address to microdot transformation
33. Real microdot
34. Fictitious microdot
35. Fictitious halftone dot
36. Energy level module
41. Laser diode drive system
42. Optical system of the laser printer
43. Photosensitive drum
44. Charge corona
45. Electro optical rendering system
46. Conductive inner drum with grounding
47. Development unit
48. Transfer corona
49. Carrier
50. Cleaner station
51. Fixer station
52. Horizontal center line
53. Rendering direction
54. White to Light Grey transition
55. Light Grey+Dark Grey to Dark transition
56. Dark to Light Grey and Dark Grey transition
57. Light Grey and Dark Grey to White transition
58. Cross
59. Grey wedge
60. Microdot
61. Screen cell
62. Pixel tone curve
63. Table value

We claim:

1. A method for rendering an image on a carrier by a rendering system, comprising the steps of:

establishing microdots on the carrier, each microdot being addressable by an address (x,y);

representing the image by one pixel per microdot, each pixel having as information the address (x,y) and an image signal $I_{x,y}$;

partitioning by a screen all microdots in partitions of identical screen cells, each screen cell comprising M (M integer and M>1) microdots $R_i$ (i=1...M);

associating each microdot $R_i$ with a pixel tone curve $L_i$, for transforming the image signal $I_{x,y}$ to an energy level E;

determining for each pixel the microdot $R_i$ from the address (x,y) and transforming the image signal $I_{x,y}$ by the corresponding pixel tone curve $L_i$, to a suitable energy level E;

converting by the rendering system the energy level E to a density level on the microdot having address (x,y); wherein there are N (N integer and N>2) energy levels $E_j$ (i=1...N) ordered in ascending or descending energy level order, and selecting an index S (1<S<N) such that:

$E_1$ is a non-marking and stable energy level;

$E_s, \ldots E_N$ are marking and stable energy levels; and all other energy levels are marking and non-stable.

2. The method according to claim 1, wherein all pixel tone curves $L_i$ transform an identical image signal $I_{*,*}$, designated for a density higher than a specific density $D_s$, exclusively to stable energy levels.

3. The method according to claim 2, wherein the choice of stable energy levels is restricted to two consecutive energy levels $E_j$ and $E_{j+1}$.

4. The method according to claim 1, wherein an identical image signal $I_{*,*}$, designated for a density lower than a specific density $D_S$, is transformed to a stable marking energy level by a first set of pixel tone curve $L_i$;

is transformed to a stable non-marking energy level by a second set of pixel tone curves $L_i$;

is transformed to a non-stable energy level by a third set of pixel tone curves $L_i$.

5. The method according to claim 4, wherein the number of pixel tone curves belonging to the third set for all image signals $I_{*,*}$ is restricted to a fraction of the amount of pixel tone curves belonging to the first and second set together for said image signal $I_{*,*}$.

6. The method according to claim 4, wherein the number of pixel tone curves belonging to the third set for all image signals $I_{*,*}$ is restricted to a fraction of the amount of pixel tone curves belonging to the first set for said image signal $I_{*,*}$.

7. The method according to claims 5 or 6, wherein the fraction. is 15 percent.

8. The method according to claim 4, wherein the third set for each image signal $I_{*,*}$ comprises maximally one pixel tone curve.

9. The method according to any of claims 4, 5 or 8, wherein exclusively $E_s$ is selected as stable marking energy level.

10. The method according to any of claims 2, 3, 4, 5 or 8, wherein the density $D_S$ is obtained by driving all microdots of the carrier by the energy level $E_s$.

11. A method for rendering an image on a carrier by a rendering system, comprising the steps of:

establishing microdots on the carrier, each microdot being addressable by an address (x,y);

representing the image by one pixel per microdot, each pixel having as information the address (x,y) and an image signal $I_{x,y}$;

partitioning by a screen all microdots in partitions of identical screen cells, each screen cell comprising M (M integer and M>1) microdots $R_i$ (i=1. . . M);

associating each microdot $R_i$ with a pixel tone curve $L_i$, for transforming the image signal $I_{x,y}$ to an energy level E;

determining for each pixel the microdot $R_i$ from the address (x,y) and transforming the image signal $I_{x,y}$ by the corresponding pixel tone curve $L_i$, to a suitable energy level E;

converting by the rendering system the energy level E to a density level on the microdot having address (x,y);

wherein the pixel tone curves $L_i$ transform each value of the image signal to an energy level that causes a micro density that is proportional to an area within the corresponding microdot $R_i$, wherein the area is defined as that portion of the microdot $R_i$ that is covered by one or more bands, of which the width is proportional to the density level represented by the image signal, have the same distance with respect to each other and are positioned and oriented such that the center lines continuously connect over neighboring screen cells.

12. The method according to claim 11, wherein the obtained pixel tone curves $L_i$ are combined with continuous tone pixel tone curves $K_i$, that are mutually identical and for which the sum over the continuous tone pixel tone curves $K_i$ over the index i, gives the same curve as the sum of pixel tone curves $L_i$ over the index i, wherein the combination $C_i$ is obtained from a weighted sum, wherein the sum of weights $(v_i, w_i, i=1\ldots M)$ is always 1: $C_i=w_i * L_i+v_i * K_i$ with $w_i+v_i=1$.

13. The method according to claim 12, wherein the weights $w_i$ are a function of the image signals $I_{x,y}$.

14. The method according to claim 12, wherein the weights $w_i$ are a linear function of the image signals $I_{x,y}$.

15. The method according to any of claims 11, 12, 13 or 14, wherein at least one center line passes through the center of at least one microdot.

16. The method according to any of claims 11, 12, 13 or 14, wherein the center lines do not pass through the center of the microdots.

17. The method according to any of claims 11, 12, 13 or 14, wherein the center line has a rational tangent.

18. The method according to any of claims 11, 12, 13 or 14, wherein the vertical distance between two center lines is always rational.

19. The method according to claim 11, wherein identical pixel tone curves are differentiated by a perturbation on the function values.

20. The method according to claim 19, wherein the perturbations are such that the algebraic sum of the perturbations within each set of equivalent pixel tone curves is zero.

21. The method according to claim 20, wherein the perturbations are alternatively positive and negative for neighboring equivalent cells.

22. A method for rendering an image on a carrier by a rendering system, comprising the steps of:

establishing microdots on the carrier, each microdot being addressable by an address (x,y);

representing the image by one pixel per microdot, each pixel having as information the address (x,y) and an image signal $I_{x,y}$;

partitioning by a screen all microdots in partitions of identical screen cells, each screen cell comprising M (M integer and M>1) microdots $R_i$ (i=1. . . M);

associating each microdot $R_i$ with a pixel tone curve $L_i$, for transforming the image signal $I_{x,y}$ to an energy level E;

determining for each pixel the microdot $R_i$ from the address (x,y) and transforming the image signal $I_{x,y}$ by the corresponding pixel tone curve $L_i$, to a suitable energy level E;

converting by the rendering system the energy level E; to a density level on the microdot having address (x,y);

wherein each pixel tone curve is a weighted sum of binary pixel tone curves from a binary screening method with higher resolution.

23. The method according to claim 22, wherein said weighted sum is based on weights and the weights are a function of the common area of the microdot of this method and the microdot of the binary screening method.

24. The method according to claim 23, wherein the function is linear.

* * * * *